United States Patent [19]
Kanamori et al.

[11] Patent Number: 5,202,935
[45] Date of Patent: Apr. 13, 1993

[54] COLOR CONVERSION APPARATUS FOR ALTERING COLOR VALUES WITHIN SELECTED REGIONS OF A REPRODUCED PICTURE

[75] Inventors: Katsuhiro Kanamori; Teruo Fumoto; Hiroaki Kotera, all of Kawasaki, Japan

[73] Assignee: Matsushita Electric Industrial Co., Ltd., Osaka, Japan

[21] Appl. No.: 926,188

[22] Filed: Aug. 7, 1992

Related U.S. Application Data

[63] Continuation of Ser. No. 779,816, Oct. 21, 1991, abandoned.

[30] Foreign Application Priority Data

Oct. 19, 1990 [JP] Japan ................................. 2-282091

[51] Int. Cl.$^5$ .............................................. G06K 9/40
[52] U.S. Cl. ........................................ 382/54; 382/17; 358/75; 358/80
[58] Field of Search ................. 382/1, 17, 54; 358/75, 358/78, 80, 28, 29

[56] References Cited
U.S. PATENT DOCUMENTS

| | | | |
|---|---|---|---|
| 5,034,806 | 7/1991 | Ikeda et al. | 358/80 |
| 5,105,466 | 4/1992 | Tsujiuchi et al. | 382/17 |
| 5,105,469 | 4/1992 | MacDonald et al. | 358/80 |

*Primary Examiner*—Jose L. Couso
*Attorney, Agent, or Firm*—Pollock, VandeSande & Priddy

[57] ABSTRACT

A color conversion apparatus is described whereby color within at least one specific region of a color picture can be converted to a different color in a reproduced picture, while enabling gradations of color and lightness within that region to be left substantially unchanged. The conversion is based upon setting of precalculated output values in a table memory within a color conversion section, by an initialization operation, and conversion can be a change in one color attribute or in a combination of attributes of respective color values within the selected region. The table memory subsequently responds to successive input color values supplied thereto by producing color-converted output values which can be supplied for example to a color printer apparatus, with resultant degrees of color change being determined in accordance with degrees of closeness of one attribute or a combination of attributes of each input color value to the corresponding attribute or combination of attributes of a predetermined color value.

11 Claims, 13 Drawing Sheets

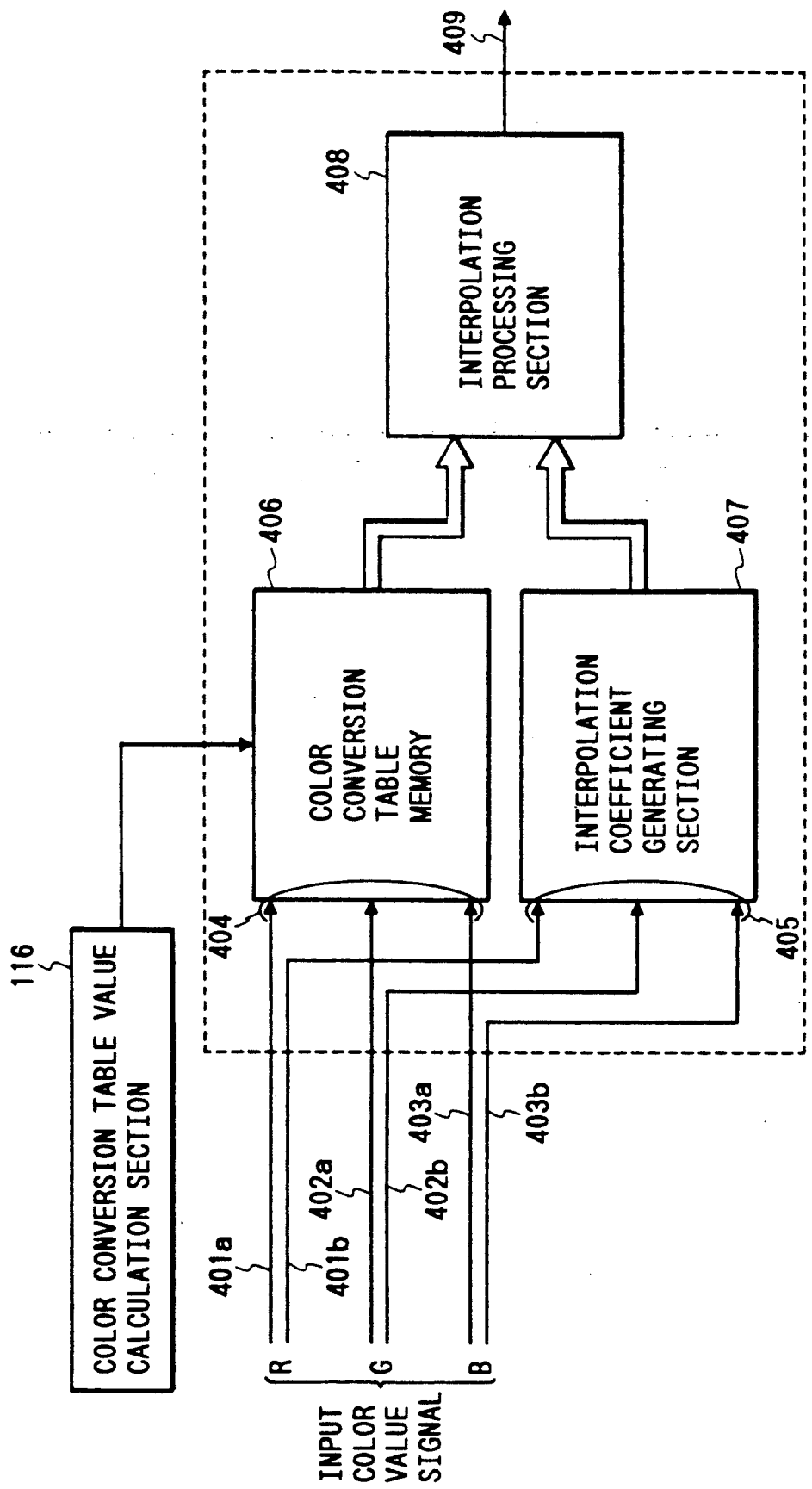

COLOR CONVERSION APPARATUS FOR ALTERING COLOR VALUES WITHIN SELECTED REGIONS OF A REPRODUCED PICTURE

This application is a continuation of Ser. No. 779,816, filed on Oct. 21, 1991 now abandoned.

BACKGROUND OF THE INVENTION

1. Field of the Invention

The present invention relates to a color conversion apparatus for adjustment of color values, for use in a color copier apparatus, color image processing apparatus, etc. In particular, the invention relates to an apparatus for adjustment of color attribute values within specific regions of a reproduced color picture, while substantially preserving the color and lightness gradations of an original color picture.

2. Description of the Related Art

A color value, e.g. of a picture element in a color picture, can be expressed as a combination of attributes consisting of a hue value, a chroma (color saturation) value, and a luminance value (i.e. degree of lightness, on a scale extending between black and white). It is possible to process the respective color values of the picture elements of a color picture such as to modify only one color attribute of each picture element without altering the chroma and luminance attribute value. In that way, a reproduced color picture can be obtained in which, for example only a modification of hue has been achieved, without altering the tonal gradations of the original color picture. One prior art proposal for a color conversion apparatus to execute such alteration of color values in a reproduced color picture without changing the tonal gradations is described in Japanese Patent Laid-open No. 2-87777. With that apparatus, as shown in FIG. 1, successive R, G, B color values which are read by a scanner from an original color picture are converted into modified values, for use by a color printer. A color system conversion circuit 141 converts each R, G, B (i.e. combination of red, green and blue coordinates) color value into a corresponding combination of L*, a* and b* attributes, corresponding to a point in a L* a* b* color space. Of these, the L* attribute represents the luminance of the color value, while a* and b* specify the chromaticity, i.e. combination of hue and chroma attributes. The luminance attribute L* is transferred through a luminance conversion circuit 144 in which it is modified by a factor $\gamma$, to execute gamma-correction and obtain a corrected luminance attribute L*O. (a*1 b*1) represent the chromaticity of a color value from which color conversion is to be executed. Such a color value will be referred to in the following as a conversion origin color value. (a*2 b*2) represent a chromaticity to which conversion is to be executed. The operation is as follows. When an input (R, G, B) color value has a chromaticity (a* b*) that is identical to (a*2 b*2), i.e. so that identical inputs A and B are supplied to the judgment circuit 142, then a logic "1" level output signal is produced from the circuit 142 and supplied through an OR gate 145 to the control input terminal of a selector circuit 143. In that case, the selector circuit 143 transfers the chromaticity (a*1 b*1) to be outputted as the final chromaticity value (a*0 b*0). If however the chromaticity of the input color value is different from (a*2 b*2), so that a "0" output is produced from the judgement circuit 142, then the selector circuit 143 transfers the chromaticity (a* b*) of the input color value without change to become the final chromaticity value. In that way, color conversion will be executed only for one specified color (i.e. combination of hue and chroma), appearing anywhere in the original color picture, into a desired color (combination of hue and chroma).

If the entire reproduced picture is to be printed in monocolor, with the chromaticity (a*1 b*1), then the "monocolor" input signal to the OR gate, which is normally at the "0" level, is fixed at the "1" level. The (a*1 b*1) chromaticity is thereby continuously transferred through the selector 143 in place of the chromaticity of each of the input color values, so that the entire reproduced color picture will appear in monocolor, with the (a*1 b*1) chromaticity.

However, with such a prior art apparatus, the following problems arise:

(1) Due to the fact that only color information is used to specify the color conversion processing that is to be executed, all of the portions of the image which have the same color as a specified value will be converted to the same new color, irrespective of position within the color picture. That is to say, it is not possible to selectively change the color of one or more specific regions of the picture.

(2) Due to the fact that conversion is limited to a single color, it is impossible to change a plurality of specific regions within the color picture to respectively different colors.

(3) In the color system conversion circuit 141, conversion of each (R, G, B) color value to (L* a* b*) is executed by computing, as each set of R, G and B values for a picture element receives (i.e. from an image scanner aparatus) the corresponding L*, a* and b* values for that picture element. However in general, the operation for converting a color value from (R, G, B) coordinates to (L* a* b*) coordinates is non-linear, so that it is not possible to obtain the (L* a* b*) coordinates by a single mathematical operation such as a matrix operation. It is first necessary to execute matrix multiplication operation to obtain from the (R, G, B) coordinates of the picture element a set of values designated as X, Y and Z, then obtain the values of L*, a* and b* for that picture element by three computations using respective non-linear equations. It is then necessary to convert the set of (L* a* b*) coordinates for the picture element into a set of color-compensated printing signal values, i.e. (Y (yellow), M (magenta), C (cyan), B (black)) values, which can be supplied to a color printer section. That conversion is executed by a section which is not shown in FIG. 1.

Thus with such a method, due to the complex computations which must be executed for each picture element color value in order to obtain signal values to be supplied to a color printer section, and since these computations must be executed by real-time operations to convert the (R, G, B) coordinates of each input color value in parallel into (L* a* b*) coordinates, the circuit scale must be large. Moreover, when such a method is applied to a color copier apparatus of the type in which picture-sequential printing is used, it is necessary to repeat these computations successively for each of the picture elements, during each operation of printing one color of the reproduced picture. The term picture-sequential printing as used herein signifies a method of color printing in which one color component is printed for the entire picture, then the next color component for the entire picture, and so on. For example, the C (cyan) color values for all of the picture elements of the picture might be printed first, then the M values for the entire picture, then all of the Y values, then finally all of the BK values.

SUMMARY OF THE INVENTION

It is an objective of the present invention to overcome the problems set out above, by providing a color conversion apparatus for use with a color hardcopy system etc, whereby color conversion can be executed between respectively different colors, whereby a single region or a plurality of regions within which color conversion is to be executed can be specified at arbitrary positions within a picture, whereby a great deal of freedom is provided in selecting the color values that are to be changed and in selecting whether one or more of the attributes of a color are to be changed, and whereby the apparatus has a simple configuration, wide applicability and ease of design.

To achieve the above objectives, the invention provides a color conversion apparatus comprising:

means for generating successive input color values respectively corresponding to picture elements of an original color picture;

first judgement means for judging, for each of said input color values, whether said input color value is within a predetermined range of closeness in color to a predetermined conversion origin color value;

second judgement means for judging, for each of said input color values, whether said input color value is within a predetermined region of said color picture;

color conversion means for altering at least one color attribute of each of a plurality of said input color values to obtain respective color-converted color values, said plurality including all of said input color values which are within said predetermined range of closeness; and selector means coupled to receive said color-converted color values and responsive to judgement results obtained by said first and second judgement means for transferring to an output terminal thereof each of said color-converted color values corresponding to an input color value which is within said predetermined region of the original color picture and which is within said predetermined degree of closeness to the conversion origin color value.

Preferably, said first judgement means and said color conversion means comprise respective table memories having stored therein respective predetermined sets of values, with the apparatus comprising initialization means for generating said sets of values and storing said sets of values into said table memories, prior to an operation for generating said successive input color values.

Furthermore, preferably said color conversion means executes a variable degree of change in said at least one color attribute of an input color value, in accordance with a magnitude of said degree of closeness.

More specifically, according to one aspect, the present invention provides a color conversion apparatus for generating an output signal consisting of successive printing values, to be supplied to a color printer apparatus, said color conversion apparatus comprising:

scanner means for scanning an original color picture to obtain successive input color values, and control means for controlling said scanner means;

first judgement means for producing a first control signal for selectively indicating, for each of said input color values, whether said input color value is within a predetermined range of closeness in color to a conversion origin color value;

second judgement means for producing a second control signal for selectively indicating, for each of said input color values, whether said input color value is within a predetermined region of said original color picture;

first color conversion means for altering at least one color attribute of each of said input color values, in accordance with a degree of closeness between said input color value and said conversion origin color value, and for applying color correction processing to a resultant color-converted color value to obtain a corresponding printing value;

second color conversion means for applying color correction processing to each of said input color values, to obtain a corresponding printing value; and selector means responsive to said first and second control signals in combination, for transferring to said color printer apparatus a printing value produced from said first color conversion means when said printing value corresponds to a color value of a picture element of said original color picture which is located within said predetermined region of the color picture and said color value is within said predetermined range of closeness to the conversion origin color value, and for transferring to said color printer apparatus a printing value produced from said second color conversion means when said printing value corresponds to a color value of said original color picture which is outside said predetermined range of closeness to the conversion origin color value.

According to a second aspect, the invention provides a color conversion apparatus for generating an output signal consisting of successive printing values, to be supplied to a color printer apparatus, said color conversion apparatus comprising:

scanner means for scanning an original color picture to obtain successive input color values;

first judgement means for producing a first control signal for selectively indicating, for each of said input color values, whether said input color value is within a predetermined range of closeness in color to a conversion origin color value;

second judgement means for producing a second control signal for selectively indicating, for each of said input color values, whether said input color value is within a predetermined region of said original color picture;

first color conversion means for altering at least one color attribute of each of said input color values, in accordance with a degree of closeness between said input color value and said conversion origin color value, and for applying color correction processing to a resultant color-converted color value to obtain a corresponding printing value;

second color conversion means for applying color correction processing to each of said input color values, to obtain a corresponding printing value; and selector means responsive to said first and second control signals in combination, for transferring to said color printer apparatus a printing value produced from said first color conversion means when said printing value corresponds to a color value of a picture element of said original color picture which is located within said predetermined region of the color picture and said color value is within said predetermined range of closeness to the conversion origin color value, and for transferring to said color printer apparatus a printing value produced from said second color conversion means when said printing value corresponds to a color value of said original color picture which is outside said predetermined range of closeness to the conversion origin color value.

BRIEF DESCRIPTION OF THE DRAWINGS

FIG. 7 is a block diagram showing the internal configuration of a color conversion section in the embodiment of FIG. 3;

DESCRIPTION OF PREFERRED EMBODIMENTS

Figure 2A:
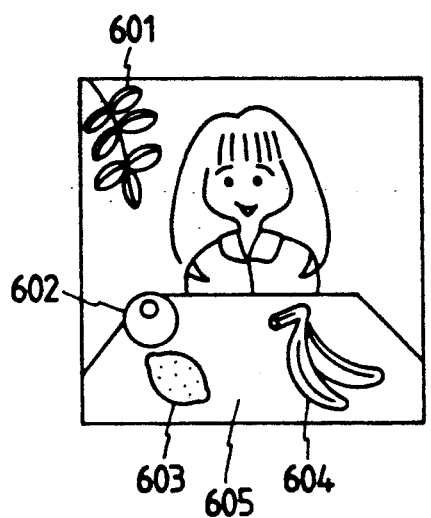
FIGS. 2a-b illustrates an example of a color picture and corresponding distributions of color values within a (L* a* b*) color space.
Figure 2B:
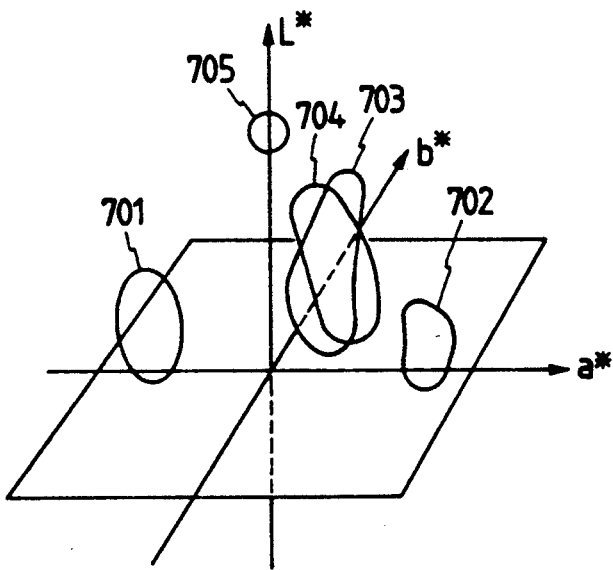

The relationship between color values appearing in a color picture and color values which are expressed in a 3-dimensional color space will be described referring first to FIG. 2. Diagram (a) of FIG. 2 represents a color picture which is widely used as a test chart, and which includes a human face, a plant 601 (green in color), an apple 602 (red in color), a lemon 603 (yellow), a banana 604 (also yellow) and the top of a table 605 (white). When the color values of such a color picture (each expressed as a set of R, G, B coordinates) are transformed into a L* a* b* color space, as shown in diagram (b) of FIG. 2, the color values of the regions 601 to 605 will be respectively transformed to the 3-dimensional regions 701 to 705. In the L* a* b* color space, the lightness (i.e. gray-scale) attribute of a color value is represented as a position on the vertical L* axis, while the chromaticity (i.e. combination of hue and chroma attributes) of the color value is represented by a position in the (a* b*) plane, so that the color value is represented as a specific point within the (L* a* b*) color space. Thus the color values of the green plant region 601 will be within the region 701, containing color values that are close to green, the color values of the (red) apple region 602 will be within the L* a* b* region 702 which contains color values that are close to red, the color values of the lemon region 603 will be within the region 703, containing values that are close to yellow, the color values of the banana region 604 will be within a region 704 which substantially overlaps the region 703, and the color values of the table region 605 will be within a small region 705 which contains color values that are close to white.

A first embodiment of the present invention will be described referring to FIG. 3, and an example of a color conversion operation executed by that embodiment will be described referring to FIGS. 4 and 5. It will be assumed as a specific example of color conversion that the color conversion operation to be executed is to change the color values of the lemon region 603 (i.e. which are close to yellow in hue) to values which are close to green in hue, while leaving chroma and luminance attributes of that region 603 unchanged, and while leaving the banana region 604 completely unchanged (in spite of the fact that the color values of the banana and lemon regions mutually overlap). More specifically, color values of the lemon region 603, which are within a predetermined range of closeness in hue to a predetermined hue (i.e. yellow), are to be shifted in hue (towards green), while other color values are to be left unconverted. In addition, since color values (including converted values) are to be generated which can be supplied to a color printing apparatus, it is necessary to apply color correction processing to all of the color values, i.e. to execute correction such as masking processing of the color values in accordance with the characteristics of the particular color printer apparatus, to then obtain corresponding printing values. Such a color correction processing operation can be considered as a color conversion operation which extends throughout the entire color space. The color correction processing, to ensure that color value signals which are supplied to a color printer will result in desired printed color values being produced in a reproduced color picture, is well known in the art, so that detailed description will be omitted.

Figure 3:
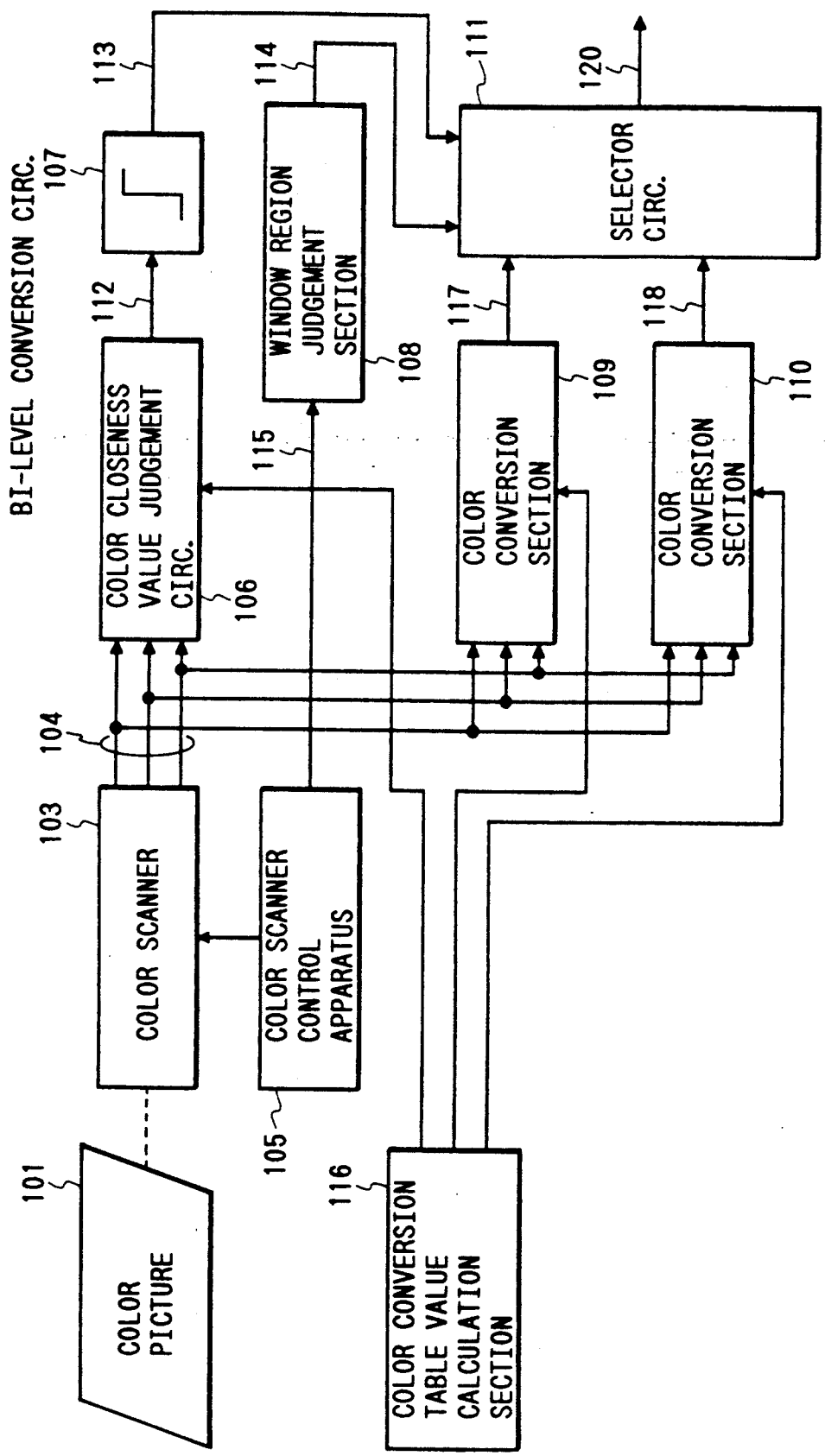
FIG. 3 is a general block diagram of a first embodiment of a color conversion apparatus according to the present invention.

In FIG. 3, an original color picture 101 is scanned by a color scanner 103 under the control of a color scanner control apparatus 105, whereby successive (R, G, B) color values corresponding to respective picture elements. These color values produced from the color scanner 103 will be referred to in the following as the input color values. The R, G and B components of each color value are outputted as respective digital data signal values, on three signal lines, with these color value signals being collectively designated by numeral 104 in FIG. 3. In this embodiment, each of the data values will be assumed to consist of 8 bits, so that each (R, G, B) color value will consist of three sets of 8 bits. The input color value signals 104 are supplied to a closeness value judgement section 106, and to color conversion sections 109 and 110. In response to each (R, G, B) color value supplied thereto, the closeness value judgement section 106 produces an output numeric value which expresses the degree of closeness between that color value and a predetermined color value from which color conversion is to be executed (for example, yellow, in the example of FIG. 4). In the example of FIGS. 4 and 5 it is assumed that the output value from the closeness value judgement section 106 expresses the degree of closeness between the hue of an input color value and a predetermined hue (i.e. yellow) of a conversion origin color value. In general however, the closeness degree can be established with respect to one or more of the attributes (hue, chroma and luminance) of a conversion origin color value. For example each output value produced from the closeness value judgement section 106 could represent a combination of the closeness of the chroma attribute and the closeness of the hue attribute of an input color value to the chroma and hue attributes respectively of the conversion origin color value.

Furthermore, in general, color conversion can be executed by shifting one or more of the attributes of a color value. However, it is assumed in the example of FIGS. 4 and 5 that the color conversion consists of only a shift in hue.

Figure 4A:
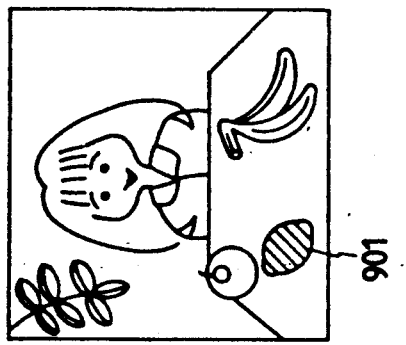
FIGS. 4a-b and 5a-b illustrates a color conversion operation which can be executed by the apparatus of FIG. 3.
Figure 4B:
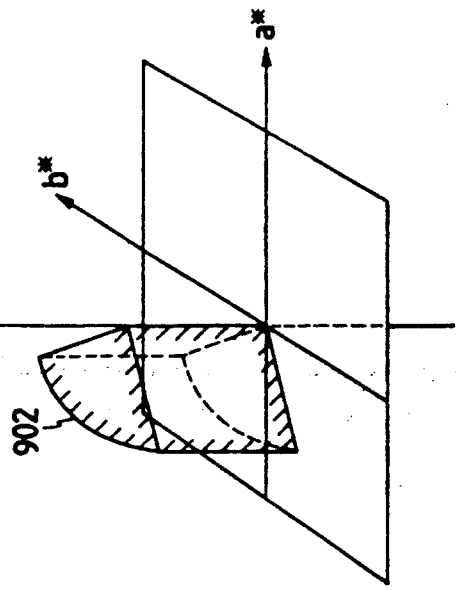

Referring to the lemon region 603 of FIG. 4, a closeness value is obtained as a numeric value from the closeness value judgement section 106 for each input color value produced from the color scanner 103, in accordance with the degree of closeness between the hue attribute of the color value and the hue (i.e. yellow) of the conversion origin color value. The values thus produced from the closeness value judgement section 106 (expressed by a set of 8 bits) are each within the range 0 to 255, with 255 corresponding to maximum color closeness. These values are supplied to a bi-level conversion section 107, which produces an output binary signal at the "1" logic level if the closeness value is equal to or above a predetermined threshold value, and at the "0" level if the closeness value is below that threshold level. Thus the threshold level of section 107 delimits a range of closeness to the hue of the conversion origin color value. The output signal from the bi-level conversion circuit 107 is designated by numeral 113.

A window region judgement section 108 receives a signal 115 from the color scanner control apparatus 105 which designates the position within the original color picture 101 of a picture element for which a color value is currently being outputted from the color scanner 103. Based on that signal 115, the window region judgement section 108 judges whether or not that picture element is within a predetermined window region of the color picture 101, for example the window region 800 that is shown in FIG. 4. If the picture element that is currently being scanned is within that window, then an output binary signal 114 from the window region judgement section 108 is produced at the "1" logic level, and otherwise is set to the "0" level. The output signals 113 and 114 from the bi-level conversion circuit 107 and window region judgement section 108 are supplied to control, in combination, a selector circuit 111.

In response to each (R, G, B) input color value received from the color scanner 103, the color conversion section 110 produces as output a corresponding printing value, which is a numeric value within a fixed range (i.e. within the range 0 to 255, in this embodiment). Each printing value 120 is a color-correction processed C, M, Y, or BK value.

The color conversion section 109, in effect, applies color conversion (i.e. in this example, a shift in hue towards the green hue) to each input color value in accordance with the degree of closeness of that input color value to the predetermined hue (yellow in this example) of the conversion origin color value, then applies color correction processing to obtain a corresponding printing value, which is outputted. In actuality, the color conversion section 109 is based on a table memory that has pre-computed values stored therein as described in detail hereinafter, so that the aforementioned printing value is directly outputted in response to a corresponding input color value.

More specifically, the operation of the conversion section 109 is equivalent to shifting the hue of each input color value by an amount determined in accordance with its closeness value, with the maximum amount of shift being applied when the closeness value is a maximum. Thus taking the example of FIGS. 11 and 12, assuming that the lemon 603 and the banana 604 in FIG. 4(a) each are substantially identical in hue to the conversion origin color value, printing values will be outputted from the color conversion section 109 in response to color values of the lemon and banana regions, such that (if all of these printing values were sent to the color printer apparatus) both the lemon and banana would be printed green in hue. The apple region 602 on the other hand (which is red in hue) will have a closeness value that is substantially zero. Hence the printing values that are outputted from the color conversion section 109 in response to each input color value of the apple region 602 will not have been shifted in hue, i.e. each will result in a printing color that is substantially identical to the original color in the color picture 101.

Figure 5A:
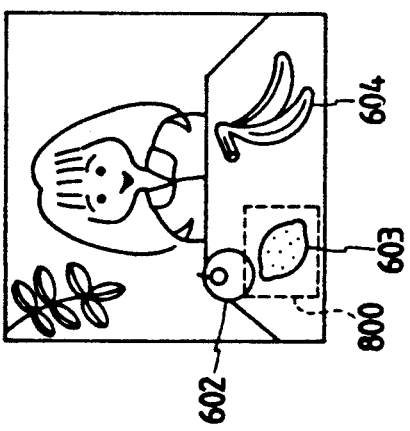
Figure 5B:
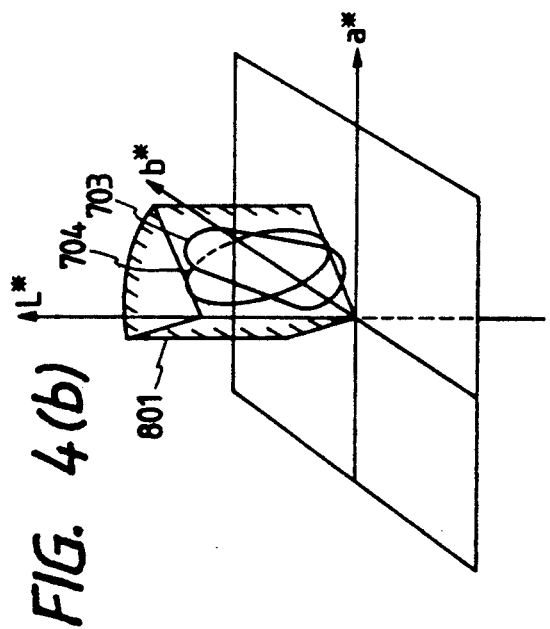

It can thus be understood that there are four possible conditions for each picture element of the color picture 101 that is scanned by the color scanner 103, in the case of the example of FIGS. 4 and 5, i.e.:

(a) If both of the outputs from the bi-level conversion circuit 107 and window region judgement section 108 are at the "1" level, thereby indicating that the picture element which is currently being scanned is within the window region 800 and that the hue of that picture element is within a predetermined range of closeness to that of the conversion origin color value, then the selector circuit 111 selects the corresponding output printing value 117 from the color conversion section 109 to be supplied (as printing value signal 120) to the color printer apparatus. That printing value, generated as described hereinafter based on read-out from a table memory, is substantially identical to a printing value that would be obtained by shifting the hue of that input color value by a specific amount (in accordance with the degree of closeness to the hue of the conversion origin color value), then applying color correction processing to the resultant color value, and converting the result to a printing value.

(b) If the output from the bi-level conversion circuit 107 is at the "1" level and the output from the window region judgement section 108 is at the "0" level, then this indicates that the picture element hue is within the predetermined range of closeness to that of the conversion origin color value, but that the picture element position is outside the window region. The selector circuit 111 selects the corresponding output printing value from the color conversion section 110. That printing value is substantially identical to a printing value that would be obtained by applying color correction processing to that input color value and converting the resultant value to a printing value.

(c) If the output from the bi-level conversion circuit 107 is at the "0" level and the output from the window region judgement section 108 is at the "1" level, then this indicates that the picture element color is outside the predetermined range of closeness to the conversion origin color value, and that the picture element position is within the window region. In that case the selector circuit 111 again selects the output printing value from the color conversion section 110 to be transferred to the color printer apparatus.

(d) If the output from the bi-level conversion circuit 107 is at the "0" level and the output from the window region judgement section 108 is also at the "0" level, then this indicates that the picture element color is outside the predetermined range of closeness to the conversion origin color value, and that the picture element position is outside the window region. In that case the selector circuit 111 also selects the corresponding printing value 118 from the color conversion section 110, to be transferred to the color printer apparatus.

It can thus be understood that, in general, the color conversion operation executed by the color conversion section 109 of this embodiment, in conjunction with the selection operation of the selector circuit 111 under the control of the output signals from the bi-level conversion circuit 107, is equivalent to shifting an input color value that is within one specific 3-dimensional region of the L* a* b* color space, for example the region 801 shown in diagram (b) of FIG. 4, into a a different region of that color space, e.g. the region 902 in diagram (b) of FIG. 5, then applying color correction processing and converting the resultant color value to a printing value. In the above example, the shift consists only of a change in hue, so that the region 801 is centered on the yellow hue while the region 902 contains hue values that are close to green. However, the invention is not limited to such a change. It can be understood that the size of the region 801, as viewed in plan, is determined by the threshold level of the bi-level conversion circuit 107 in FIG. 3, which determines the size of the aforementioned range of values of closeness to the hue of the conversion origin color value.

In the case of input color value that is not within the color space region 801, the selector circuit 111 is controlled by the combination of control signals 113 and 114 such that the corresponding printing value produced from the color conversion section 110 is selected, i.e. a printing value has not been subjected to a shift in color, but only to color correction processing.

Each of the closeness value judgement section 106 and the color conversion sections 109, 110 basically consists of a table memory. Each table memory produces a specific numeric value or set of numeric values, in response to each (R, G, B) input color value supplied thereto. To ensure that the table memories will produce the correct output values, it is necessary to initially set an appropriate set of values into each of them. The embodiment of FIG. 3 is for use with the aforementioned picture-sequential printing method, in which the entire color picture 101 is first sequentially scanned, whereby all of the printing values for one color component (e.g. the C values) of the color picture are sequentially derived and sent to the color printer apparatus (as signal 120), then the picture is again scanned and printing values for another component are derived and sent, and so on, e.g. for the M valves. The same process is repeated for the Y values, and finally the BK values. It is a basic feature of the present invention that prior to deriving the printing values for one of the printing color components, e.g. the C values, an initializing operation is executed for setting into the respective table memories of the color conversion sections 109, 110 appropriate sets of values for producing the requisite C printing values in response to the successive (R, G, B) input color values supplied from the color scanner 103. That is to say, after a first one of these initializing operations has been completed, the color scanner 103 is set in operation, the entire original color picture 101 is scanned to obtain successive input color values 104, and the resultant C (cyan) printing values (for example) are successively transferred to the color printer apparatus as signal 120. When that has been completed, a second initializing operation is then executed, to set into the table memories appropriate values for generating the M (magenta) printing values, then the color scanner 103 is again set in operation, the entire color picture 101 is again scanned, and the same set of input color values 104 are again successively generated, with corresponding M printing values being outputted as signal 120 from the selector circuit 111 and transferred successively to the color printer apparatus. The same procedure is then repeated to generate all of the Y (yellow) printing values, then the BK (black) printing values. (It is of course not essential to use that particular sequence of C, M, Y, BK picture-sequential printing).

It is also necessary to initially set into the table memory of the closeness value judgement section 106 a suitable set of values for generating output closeness values in response to the input color values. As described hereinafter, that can be done in parallel with initializing the conversion section 109 of this embodiment.

Figure 6:
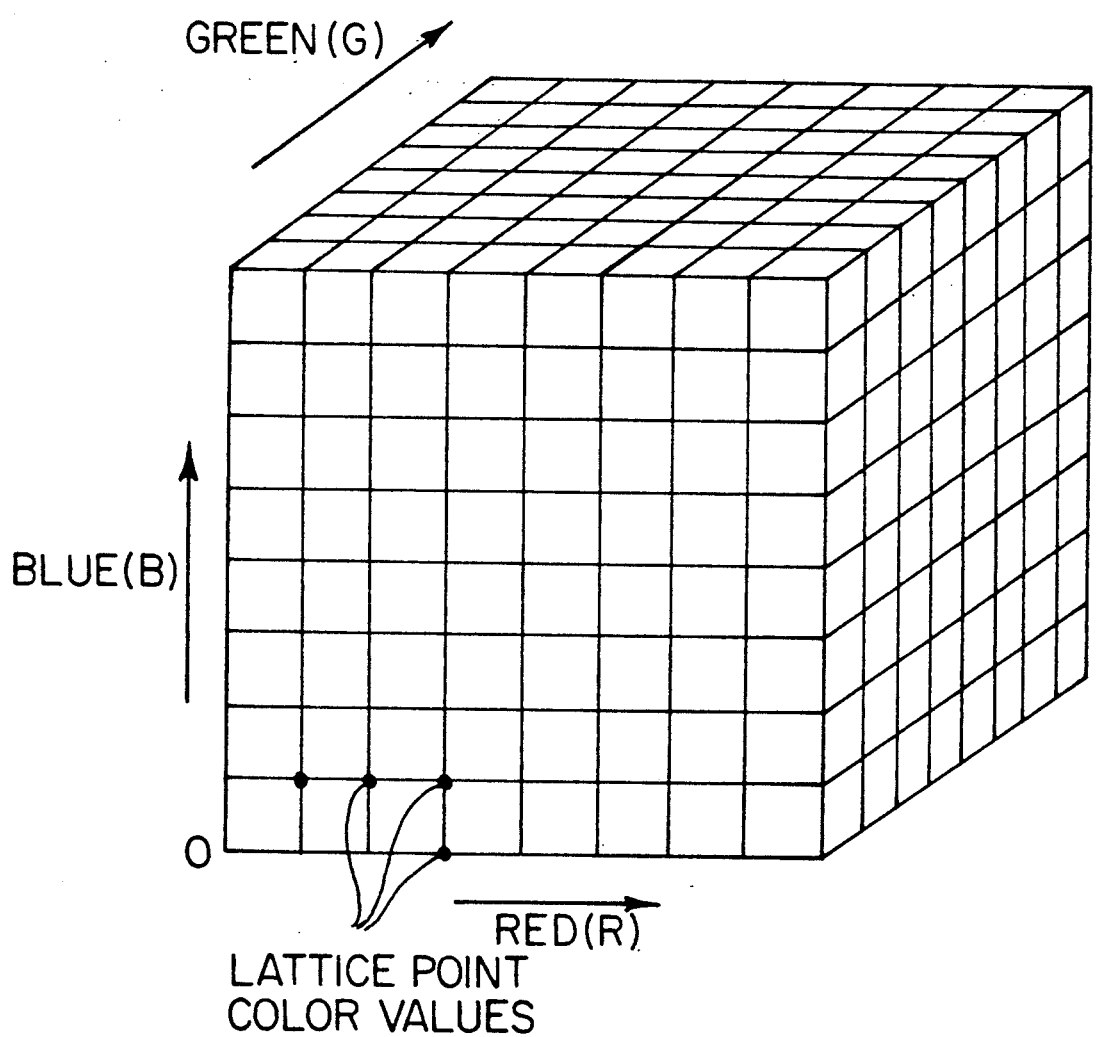
FIG. 6 illustrates a distribution of lattice point color values in an R, G, B color space.

The values that are set into the table memories are computed and supplied by a color conversion table value calculation section 116. The color conversion table value calculation section 116 can (e.g. by read-out from a ROM) generate successive ones of a set of (R, G, B) color values which correspond to an array of points that are spaced apart at regular intervals in an R, G, B, color space. Since these points coincide with intersection points in a lattice formed in a R, G, B color space, the color values stored in the color conversion table value calculation section 116 will be referred to as lattice point color values. FIG. 6 illustrates how such lattice point color values are arrayed at regular spacings in a R, G, B color space. The coordinates of such a lattice point color value will be designated in general as $(R_i, G_i, B_i)$, corresponding to positions along the red, green and blue axes respectively in FIG. 6. The resolution of the set of lattice point color values in this embodiment is lower than the scanning and printing color resolution of the system, so that an excessive amount of capacity will not be necessary for the table memory in the color conversion table value calculation section 116. Thus for example, if the data word length used in the system to express each of the R, G and B coordinate values of a color value that is outputted from the scanner is 8 bits, only a set of high-order ones of these bits will be used to express the R, G, B coordinate values of a lattice point color value. For example, a particular lattice point color value might be expressed in (R, G, B) form as three sets of four bits, if each of the input color values from the scanner is expressed as three sets of 8 bits. Alternatively stated, each color value that is outputted from the color scanner 103 utilizes all of the 8-bit word length, and so can represent color values that are intermediate between the lattice point color values in the R, G, B color space, each of which is expressed by a set of high-order bits. It can thus be understood that specific low-order bits of an (R, G, B) input color value signal 104 from the color scanner 103, other than the aforementioned set of high-order bits, express a position in the R, G, B color space with respect to a lattice point color value.

FIG. 7 shows, in general form, the internal configuration of the color conversion section 109. The closeness value judgement section 106 and the color conversion section 110 also has this same internal configuration, however the structure and method of initializing the table memory data value will first be described for the case of the color conversion section 109. It is also necessary, prior to executing the first scanning operation, to initialize the window region judgement section 108, to specify the position and size of the window region 603, and it may also be necessary to initialize the threshold level that is set for the bi-level conversion circuit 107, to thereby select the aforementioned range of values of color closeness for which a "1" level output signal is produced from circuit 107.

Numeral 406 denotes a color conversion table memory into which, in each table initialization operation, is stored a set of printing values which respectively correspond to the aforementioned set of lattice point color values. In the table initialization operation these printing values are successively computed, from each lattice point color value, by the color conversion table calculation section 116 as described in detail hereinafter, and stored in the color conversion table memory 406. The aforementioned high-order bits of the R, G and B coordinates of an input color value (which in combination express a lattice point color value) from the scanner 103 are supplied via three sets of connecting leads designated as 401a, 402a and 403a respectively to the color conversion table memory 406, as read-out address bits. The aforementioned low-order bits of the R, G, B coordinates of the input color value (i.e. which in combination express the position of the color value in the R, G, B space with respect to the lattice point color value which is expressed by the high-order bits) are supplied via three sets of connecting leads designated as 401b, 402b and 403b respectively to an interpolation coefficient generating section 407. Output printing values produced from the color conversion table memory 406 (each being a single numeric value as described hereinabove) and interpolation coefficients produced from the interpolation coefficient generating section 407 are supplied to an interpolation processing section 408, in which each printing value that is produced from the color conversion table memory 406 is modified by applying weighting in accordance with the corresponding interpolation coefficient, to obtain an interpolated output printing value. The values of interpolation coefficients are selected such as to ensure that when successive variations in the output printing values occur which correspond to a gradual change in color throughout a region of the original color picture 101, these printing values will result in smoothly varying changes in color of the resultant printed color picture, without abrupt changes in color occurring.

Figure 8A:
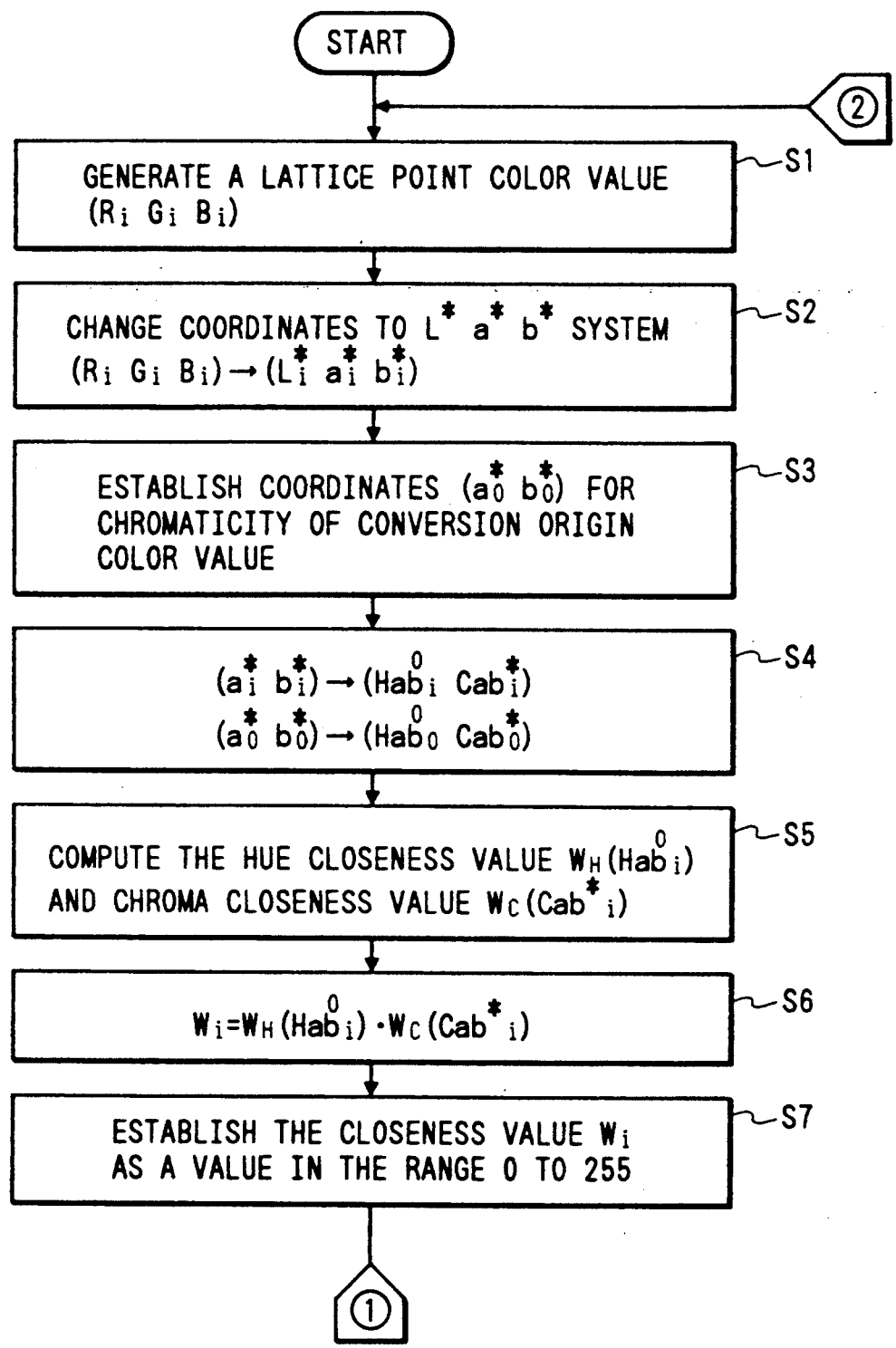
FIGS. 8A and 8B constitute a flow diagram for describing a process of generating color picture values to be set into a table memory in an initialization operation, for the embodiment of FIG. 3.

The initialization operation whereby the color conversion table value calculation section 116 computes successive printing values in response to each of the ($R_i$, $G_i$, $B_i$) lattice point color values, with these printing values then being set into the color conversion table memory 406, will be described referring to the flow diagram of FIGS. 8A, 8B. For generality, an initialization operation will be described in which the values of color closeness between each lattice point color value and the conversion origin color value are derived based on the hue and also the chromaticity of the conversion origin color value, rather than being based on the hue alone as would be the case for the example of FIGS. 4 and 5 described hereinabove.

First in step S1 one of the set of lattice point color values, having R,G,B coordinates ($R_i$, $G_i$, $B_i$) is generated (e.g. by reading out from a ROM). Next in step S2, the coordinates of that color value are transformed to $L^*$ $a^*$ $b^*$ coordinate form, as $L^*_i$ $a^*_i$ $b^*_i$, where $L^*_i$ expresses the luminance attribute and the coordinates $a^*_i b^*_i$ express the chromaticity of the lattice point color value, in an $L^*$ $a^*$ $b^*$ color space. Next in step S3, chromaticity coordinates $a^*_0$ $b^*_0$ are established, for the conversion origin color value. These may be established, for example, in response to an input value that is specified by a user (using for example a device such as a computer terminal that is coupled to the color conversion table value calculation section 116, not shown in FIG. 3). In the following step S4, the coordinates ($a^*_i$ $b^*_i$) and ($a^*_0$ $b^*_0$) are respectively converted to corresponding combinations of hue and saturation attribute values (Hab$^\circ_i$ Cab$^*_i$) and (Hab$^\circ_0$ Cab$^*_0$) for the lattice point color value and the conversion origin color value. Each hue value is expressed as a numeric value in the range 0 to 360, representing an angle in degrees, while each chroma value is expressed as a positive numeric value.

Next in step S5, the degree of closeness between the hue attributes of the lattice point color value and the conversion origin color value is obtained as a onedimensional numeric value designated as $W_H$(Hab$_i$), with that value being normalized to be within the range 0 to 1 (i.e. with a value of 1 corresponding to maximum closeness). Similarly, the degree of closeness between the chroma attributes of the lattice point color value and the conversion origin color value is obtained as a one-dimensional numeric value designated as $W_C$(Cab$^*_i$), which is also normalized to the range 0 to 1.

In the following step S6, these values of closeness are multiplied together to obtain a color closeness value $W_i$ for that lattice point color value. That closeness value is then expressed as a value in the range 0 to 255 in step S7 (i.e. with 255 corresponding to maximum closeness).

In the following step S8, shown in FIG. 8B, one or more of the coordinates $L^*_i$, $a^*_i$ and $b^*_i$ of that lattice point color value is modified in accordance with the closeness value $W_i$, such as to produce the desired color conversion, with the amount of change being determined by the closeness value of the lattice point color value. For example, in the case of the color conversion required for the lemon of FIG. 8(a), in which only a change in hue is to be executed, only the coordinates $a^*_i$ and $b^*_i$ will be operated on, with the luminance attribute $L^*_i$ being left unchanged. However, in general, the processing that is executed in step S8 can be expressed as:

$$L^*_i{}' = f1\{W_i, L^*_i\}$$

$$a^*_i{}' = f2\{W_i, a^*_i\}$$

$$b^*_i{}' = f3\{W_i, b^*_i\}$$

Where $L^*_i{}'$, $a^*_i{}'$ and $b^*_i{}'$ denote respective color-converted coordinates.

In practice, it may be preferable to execute the color conversion by operating on the two one-dimensional values of hue and chroma $Hab^{*'}_i$ and $Cab^{*'}_i$ that were obtained in step S5 above. For example, if color conversion is to consist of a change in hue and chroma, with no change in luminance, then converted values of hue and chroma can be obtained as follows:

$$Hab^{*'}_i = Hab^{*}_i + (W_i D_H) \quad (1)$$

$$Cab^{*'}_i = Cab^{*}_i \{1 + \{W_i(K_C - 1)\}\} \quad (2)$$

In that case, the amount of change in hue and in chroma is determined in accordance with the degree of closeness $W_i$ of the lattice point color value to the conversion origin color value, in conjunction with a value $D_H$ in the case of hue and a value $K_C$ in the case of chroma. $D_H$ can be positive or negative, to specify an amount of shift in hue as an amount of angular rotation (i.e. about the $L^*$ axis) in the $(a^* b^*)$ plane, e.g. expressed as a number of degrees. The quantity $K_C$ specifies an amount by which the chroma of a lattice point color value is to be multiplied. If for example $K_C$ is made 0, then (assuming for example that the closeness value $W_i$ is 1) the chroma will be converted to zero, while if $K_C$ is made equal to 2, the chroma will be doubled.

Thus, the user can specify a desired color conversion as an amount of change in hue and/or chroma, by appropriately specifying values for $K_C$ and $D_H$.

The coordinates $a^{*'}_i$ and $b^{*'}_i$ corresponding to the combination of converted hue and chroma values can then be derived from the converted hue and chroma values, to be used in the succeeding step S9. In that case, the luminance value $L^{*'}_i$ in step 9 is of course made identical to the luminance $L^{*}_i$ of the lattice point color value.

If a change in hue alone is to be executed (e.g. to change the lemon region 603 in FIG. 4(a) from yellow to green in hue, with no change in chroma or luminance), then execution of the equation (2) above can be omitted, or the value $K_C$ in that equation can be set as 1. In that case, the position of the region 902 into which color conversion is executed in the example of FIGS. 4 and 5, will be determined by the value that is specified for $D_H$ in equation (1) above.

The converted lattice point color value $L^{*'}i \, a^{*'}i \, b^{*'}i$ is then transformed to corresponding coordinates in an RGB color space, as $(R_i', G_i', B_i')$, in step S9. In step S10, these coordinates are converted to a corresponding set of RGB color density coordinates, as $(Dr_i' \, Dg_i' \, Db_i')$, and in step S11 these color density coordinates are subjected to the aforementioned color correction processing and converted into a corresponding cyan, magenta, yellow or black color value, i.e. $C_i, M_i, Y_i$, or $BK_i$. That is to say, if the initialization operation is being executed prior to executing a scanning operation for deriving the C (cyan) printing values, then a cyan color value will be derived in step S11.

In step S12, the value $C_i$ (or $M_i, Y_i$ or $BK_i$) thus obtained is expressed as a numeric value in the range 0 to 255, and is set into the corresponding location of the color conversion table memory 406 as the printing value that corresponds to the lattice point color value $(R_i \, G_i \, B_i)$.

The above sequence of steps is repeated for each of the set of lattice point color values that are generated in the color conversion table value calculation section 116, with a printing value that is obtained in step S12 being stored in the table memory 406 in a location that is predetermined to correspond with each $(R_i, G_i, B_i)$ lattice point color value.

During the initialization operation described above for the color conversion section 109, each time that a color closeness value $W_i$ is derived in step S6, that value is set into a table memory within the closeness value judgement section 106, corresponding to the table memory color conversion table memory 406. In that way, initialization of the closeness value judgement section 106 (by setting therein closeness values which respectively corresponding to the lattice point color values) can be executed in parallel with initializing the color conversion section 109.

More specifically, assuming that the aforementioned picture-sequential color printing operation is executed in the sequence C, M, Y, BK, then the first time the above sequence of steps is executed (i.e. repetitively, for each of the lattice point color values), each $C_i$ printing value that is obtained in step S12 is set into the color conversion table memory 406, in correspondence to the lattice point color value having coordinates $(R_i \, G_i \, B_i)$. When all of the C printing values for the set of lattice point color values have been derived and set into the color conversion table memory 406, and corresponding color closeness values have been set into the closeness value judgement section 106, another initialization operation for deriving and setting C printing values into the color conversion section 110 is executed (as described hereinafter). When that has been completed, the color scanner 103 is set in operation. As each (R, G, B) input color value thereafter generated by the scanner 103 is supplied to the color conversion section 109, a corresponding C printing value is outputted from the color conversion table memory 406 in response to the high-order bits of that input color value, and a corresponding interpolation coefficient is outputted from the interpolation coefficient generating section 407 in response to the low-order bits of the input color value, with these being combined in the interpolation processing section 408 to obtain a final C printing value from the color conversion section 109. Similarly, a corresponding C printing value for that input color value is simultaneously produced from the color conversion section 110, and at the same time a corresponding closeness value is outputted from the closeness value judgement section 106. Although the respective sets of printing values are assumed in the above to be generated in the sequence C, M, Y, BK, it would be equally possible to use a different sequence.

When the entire color picture 101 has been scanned, and a corresponding set of C (cyan) printing values have been generated as the output signal 120 in FIG. 3 and sequentially transferred to the color printer apparatus, a second initialization process is executed, to set into the color conversion section 109 and color conversion section 110 a set of M (magenta) printing values corresponding to the lattice point color values. The process is the same as that described above referring to FIGS. 8A and 8B. However in this case, an M printing value is obtained in step S12 and is set into the color conversion table memory 406 of the color conversion section 109, and similarly, a set of M printing values are stored in the color conversion section 110. The color scanner 103 is then again set in operation, and the resultant sequential M printing values that are outputted from the selector circuit 111 are supplied to the color printer apparatus. When that has been completed for the entire color picture, a third initialization process is executed for the Y (yellow) printing values, then scanning is again executed to generate all of the Y printing values to be sent to the color printer apparatus. The procedure is finally repeated for the BK (black) printing values, to complete the printing operation, i.e. a reproduced color picture is obtained which consists of successively superimposed cyan, magenta, yellow and black images.

The table initialization operation for the color conversion section 109 has been described hereinabove referring to FIGS. 8A, 8B. The corresponding initialization operation for deriving and storing a set of values into the color conversion table memory 406 of the color conversion section 110 differs from that described above, since it is not necessary to derive color closeness values W(R, G, B) or to execute color shifting, but only to execute color correction processing to obtain the printing values. Thus, in this case, operation will jump from step S1 in FIG. 8A to step S10 followed by steps S11 and S12 in FIG. 8B. That is, each input $(R_i, G_i, B_i)$ lattice point color value will be converted into color density coordinates $(D_{Ri}, D_{Gi}, D_{Bi})$, which will then be subjected to color correction processing and converted to a C, M, Y or BK printing value (depending upon which of the sequentially executed initialization operations is in progress). If for example, the initialization operation prior to printing the C component of the picture is being executed, then each C printing value that is thus obtained is then stored in a table memory in the color conversion section 110 which corresponds to the color conversion table 406 in FIG. 7.

Figure 1:
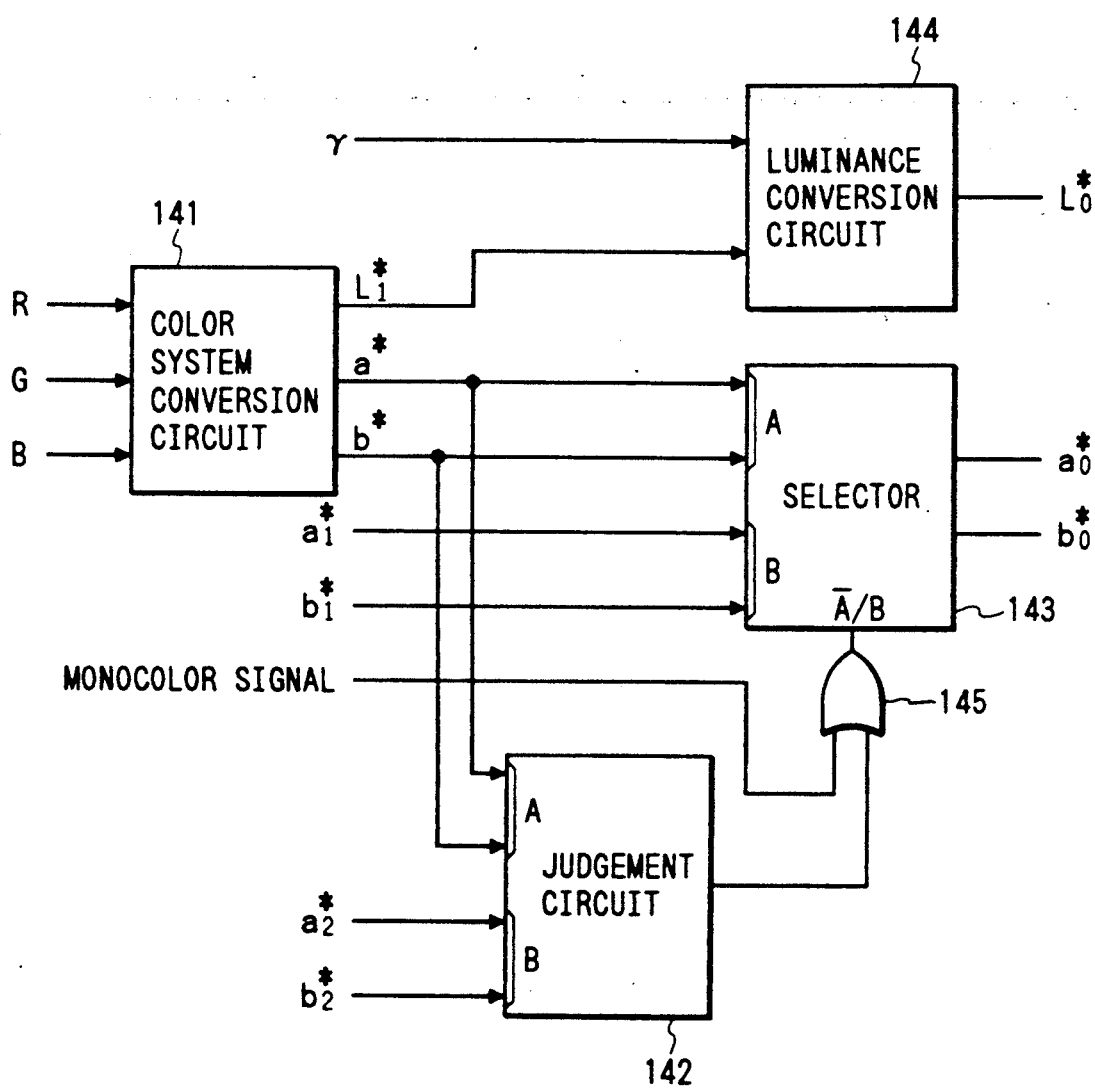
FIG. 1 is a general block diagram of a prior art example of a color conversion apparatus.

To summarize the initialization operations necessary for the embodiment of FIG. 1, the initialization must be executed such that various system sections respectively respond as follows to each of the input color values which are generated during the succeeding scanning operation:

(a) For the window region judgement section 108

An output signal value of "1" is produced if the position of the input color value is within the predetermined window region, otherwise a value "0" is produced.

(b) For the color closeness judgement section 106

An output numeric value in the range 0 to 255 is produced in accordance with the degree of color closeness of one attribute or a combination of attributes of the input color value to the corresponding attribute or combination of attributes of the predetermined conversion origin color value.

(c) For the color conversion section 109

A corresponding printing value is produced, having a predetermined amount of shift of one attribute or a plurality of attributes, weighted in accordance with the aforementioned degree of color closeness.

(d) For the color conversion section 110

A corresponding printing value is produced.

(e) For the selector 111

If respective output signals from the bi-level conversion circuit 107 and the window region judgement section 108 indicate, in combination, that the input color value is within the predetermined window region and that the corresponding numeric value from the closeness value judgement circuit 106 is above a predetermined threshold, then the output printing value from the color conversion circuit 109 is selected. Otherwise, the output printing value from the color conversion circuit 110 is selected.

During each initialization operation, it is not actually necessary to set specific printing values into the color conversion section 109 in correspondence with any lattice point color value which is outside the range of color closeness that is determined by the bi-level conversion circuit 107, i.e. any arbitrary values could be set into (or left remaining) the table memory of conversion section 109 in such cases, since these will never be selected by the selector 111.

In the description of the first embodiment given with reference to the example of FIGS. 4 and 5, it was assumed for the purpose of description that color conversion is executed for each color value within the window region 800 in FIG. 4(a) having a value of hue attribute that is within a predetermined range of closeness to the hue (yellow) of a conversion origin color value, and that the hue of each selected color value is shifted towards the green hue by an amount in accordance with that degree of closeness. However, it will be apparent that various other types of selection and color conversion are possible. For example, it would be possible to select only the color values within the window 800 which are within a predetermined range of closeness in both hue and chroma values to those of the conversion origin color value, to be shifted to new values of hue and/or chroma. This can be advantageous in some cases. If for example the window region 800 contained the apple 602 and a part of the human face shown in the picture, and the hue of the apple were to be converted (e.g. from red to green), then problems would arise if closeness values were to be derived on the basis of hue alone, since the human face will generally include some regions which are red in hue. In such a case, since the color values of the apple will have a high value of chroma, and the color values of face will in general have a low value of chroma, it can be ensured that no shift in hue will occur for the face region, if the closeness value $W_i$ relative to the conversion origin color value is determined on the basis of closeness of both hue and chroma, as shown in step S6 of FIG. 8A. If that is done, then each color value of the face region will have a low value of closeness value $W_i$ and so will be left unchanged in hue (i.e. the output values from conversion section 110 will be selected, while scanning of the face region is in progress), while each color value of the apple region will have a high closeness value and so will be converted in hue (i.e. the output values from the conversion section 109 will be selected by selector 111, while scanning of the apple region is in progress).

It should also be noted that it would be equally possible to establish the closeness value $W_i$ on the basis of the luminance attribute of each color value, or any combination of the luminance, chroma and hue attributes.

Figure 8B:
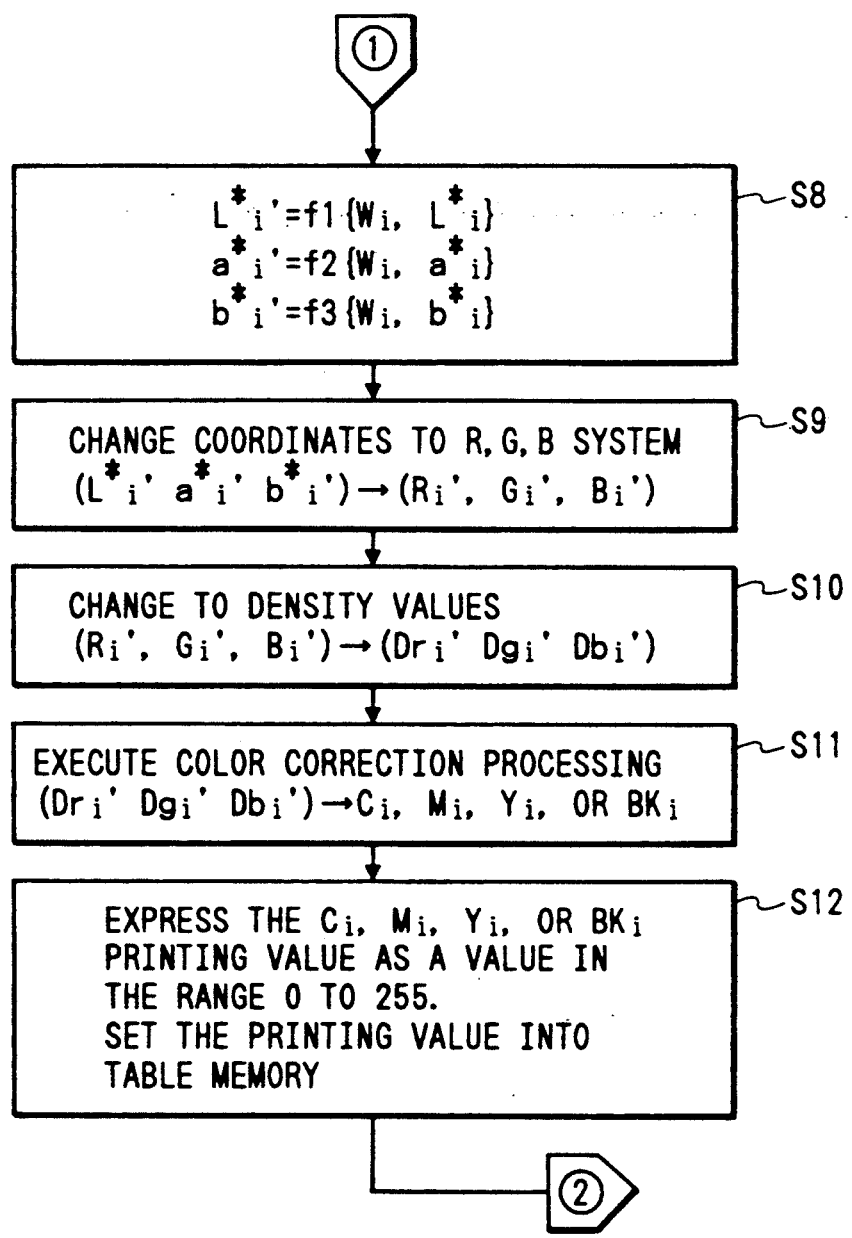

Furthermore, although only color conversion by a change in hue (i.e. from yellow to green) has been described in the above, it would be equally possible, as expressed by the equations of step S8 of FIG. 8B, to execute color conversion as a change in any one of (or any combination of) the luminance, hue and chroma attributes of the input color values.

Figure 9A:
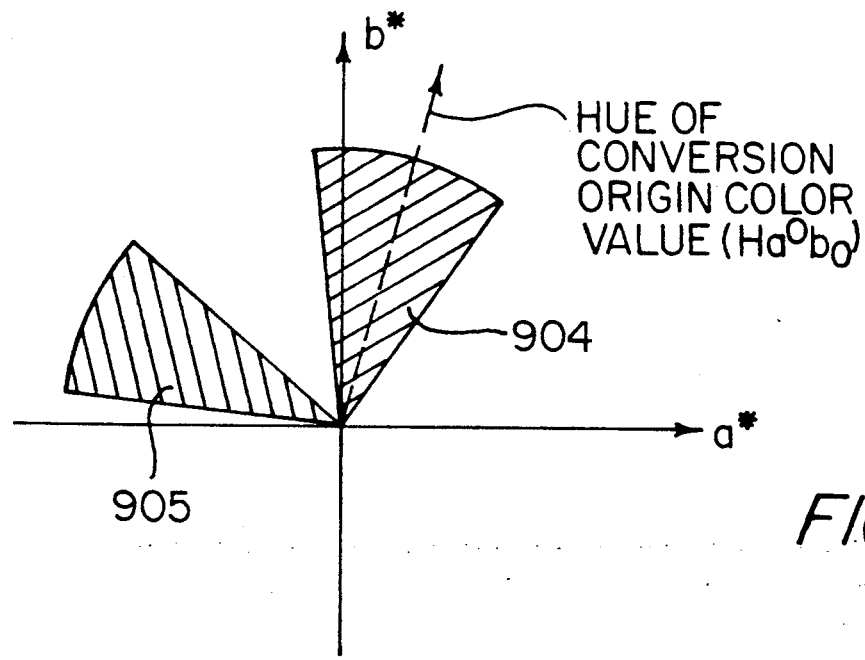
FIGS. 9A, 9B and 9C are diagrams for illustrating respectively different types of color conversion operation which can be executed by the embodiment of FIG. 3, as seen in the a* b* plane of a (L* a* b*) color space.
Figure 9B:
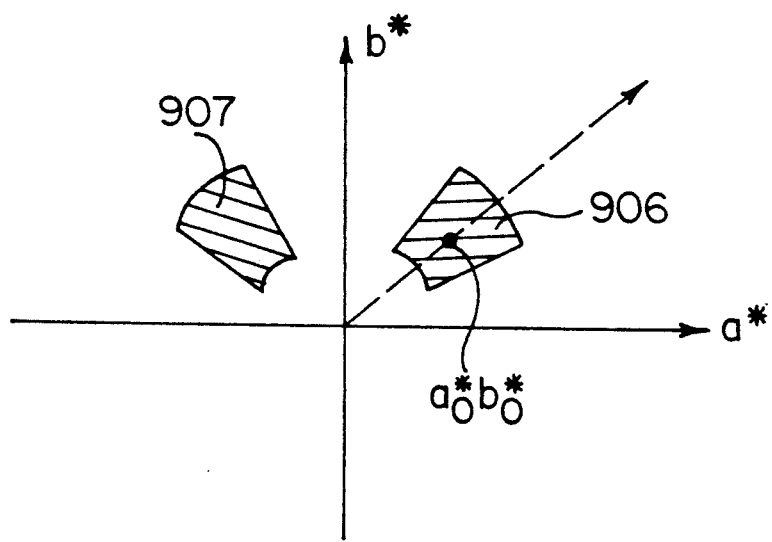
Figure 9C:
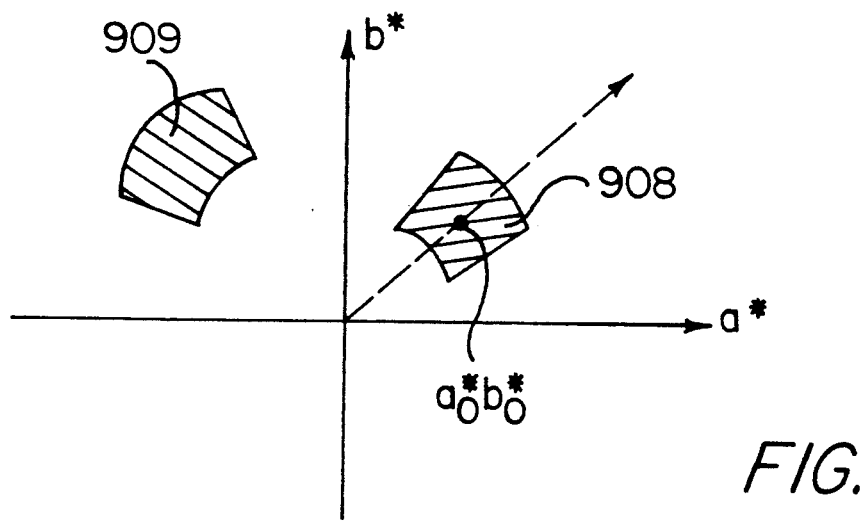

In the example of FIGS. 4 and 5, it is assumed that the closeness value $W_i$ is derived only on the basis of hue values, so that the region 801 (in the (L* a* b*) color space) of color values that are within the predetermined range of closeness to the conversion origin color value will be fan-shaped, as viewed perpendicular to the a* b* plane. In addition, it is assumed that the color conversion consists of only a shift in hue, in accordance with the value of $W_i$. Hence, the conversion operation is equivalent to a rotation in the a* b* plane about the L* axis so that as shown in diagram (b) of FIG. 5, the region 902 into which color conversion is executed will also be fan-shaped as viewed in plan. FIGS. 9A, 9B and 9C are respective views perpendicular to the a*b* plane, to illustrate respective examples of different types of color conversion that can be executed with the present invention. In FIG. 9A, the conversion operation of FIGS. 9 and 10 described above is illustrated. As shown, the 3-dimensional region 904 of color values that are within the predetermined range of closeness to the conversion origin color value (determined by the closeness value judgement section 106 and bi-level conversion circuit 107 in FIG. 3) is fan-shaped as viewed perpendicular to the a* b* plane, and is bisected by a vector whose angular position corresponds to the hue of the conversion origin color value, i.e. to $Ha^0b_0$ in step S4 of FIG. 8A described above.

FIG. 9B illustrates the case in which the closeness value $W_i$ is derived on the basis of both hue and chroma values (as described above referring to step S6 of FIG. 8A). In this case, the shape of the 3-dimensional region 906 of values within the predetermined range of closeness to the conversion origin color value will be an annular segment, as viewed perpendicular to the a* b* plane. The coordinates $a^*_0 b^*_0$ representing the chromaticity of the conversion origin color value will correspond to the center of that region 906. If a shift in hue alone is executed in this case, as the color conversion operation, then the region into which conversion is executed will be as indicated by numeral 907.

FIG. 9C illustrates the case in which the closeness value $W_i$ is derived on the basis of both hue and chroma values, and in which the color conversion operation consists of both a shift in hue and also a shift (increase) in chroma. In this case, the region 909 into which conversion is executed will be radially displaced, in relation to the region 908 of color values within the predetermined range of closeness to the conversion origin color value.

A second embodiment of a color conversion apparatus according to the present invention will be described referring to the general block diagram of FIG. 10 and to FIGS. 11 and 12. This embodiment differs from the first embodiment described above in that it becomes possible to simultaneously change colors within two different window regions (designated as 1001 and 1002 in diagram (a) of FIG. 11), to two respectively different colors. It will be assumed for example that the (yellow hue) lemon 603 in window region 1001 is to be changed to the green hue, while the (yellow hue) banana 604 in the window region 1002 is to be changed to the red hue.

The apparatus of FIG. 10 differs from that of FIG. 3 in that the closeness value judgement section 106 and bi-level conversion circuit 107 of FIG. 3 are omitted, and in that two color conversion sections 209, 309 are provided, each of which executes a basically similar function to that of the color conversion section 109 of FIG. 3 described hereinabove, and each of which has the internal configuration shown in FIG. 7 and described hereinabove. In this embodiment, the color conversion section 209 executes a shift of hue towards the green hue, for color values which are within a predetermined range of closeness to the yellow hue, while the color conversion section 309 executes a shift of hue towards the red hue, for color values which are within a predetermined range of closeness to the yellow hue. It can thus be understood that in this embodiment, in order to avoid excessively increasing the system scale while enabling respectively separate conversion from any arbitrarily selected color to any other color within each of the window regions 1001, 1002, initialization of the conversion sections 209 and 309 is executed in such a way that the functions of the closeness value judgement section 106 and bi-level conversion circuit 107 of FIG. 3 have been incorporated into the functions of each of the color conversion sections 209 and 309. This can be readily implemented, by suitably modifying the table memory initialization procedure. For example, assuming that in step S8 of FIG. 8B only the operation of equation (1) above is executed (to implement color conversion as a shift in hue alone) then an additional step can be inserted prior to step S8 of the table memory initialization sequence, in which $W_i$ will be judged and will be set to 0 if it is below a predetermined threshold. In that case, for each lattice point color value having a closeness value $W_i$ that is less than that threshold level, no shift in hue will be executed, and only color correction processing will be applied, to obtain an output printing value. For each lattice point color value having a closeness value $W_i$ that is equal to or greater than the threshold level, a shift in hue in accordance with the value of $W_i$ will be executed, then color correction processing applied to obtain a printing value, as described above referring to FIGS. 8A, 8B. It can thus be understood that in that case, the same effect will be achieved as by the combination of effects of the color conversion section 109 and the closeness value judgement section 106 and bi-level conversion circuit 107 of the embodiment of FIG. 3.

Thus, apart from a modification such as that described above, the initialization operation for each of the color conversion sections 209 and 309 can be identical to that described hereinabove referring to FIGS. 8A, 8B for the color conversion section 109 of the first embodiment. Prior to each scanning operation to derive a set of printing values to be sent to the color printer apparatus, a first initialization operation will be executed to set printing values into the color conversion table memory of one of the color conversion sections 209 and 309, in accordance with the desired form of color conversion that is required within the window region corresponding to that conversion section, then a second initialization operation will be executed for the other one of the color conversion sections.

The operation of the window region judgement section 108' of this embodiment differs from the window region judgement section 108 of the embodiment of FIG. 3 in that instead of indicating (during scanning operation by the color scanner 103) whether or not an input color value corresponds to a position within a single window region, the window region judgement section 108' produces an output signal to indicate whether the input color value is:

(a) Outside both of the window regions 1001, 1002, in which case the output signal becomes equal to 0,
(b) Inside the window region 1001, in which case the output signal becomes equal to 1,
(c) Inside the window region 1002, in which case the output signal becomes equal to 2.

The overall operation will be described based on the example of FIGS. 11 and 12, and assuming that the picture-sequential printing operation is executed in the sequence of C, M, Y and BK images. After completion of an initialization operation for setting respective sets of C (cyan) printing values into the color conversion sections 209, 309, scanning by the 103 is started, to generate successive input (R, G, B) color values as the signals 104. If an input color value is judged to be within the window region 1001, then an output signal of value 1 will be produced from the window region judgement section 108'. If that input color value corresponds to a lattice point color value having a closeness value (with respect to the yellow hue) that is greater than the aforementioned threshold level (i.e. it is a color value of the lemon 603), then a resultant printing value (corresponding to a color value having a hue that is shifted towards the green hue) will be outputted from the color conversion section 209. At the same time, a corresponding printing value having a hue that is shifted towards the red hue will be outputted from the color conversion section 309. However, only the output printing value from the color conversion section 209 will be selected by the selector circuit 111, since the output signal from the window region judgement section 108' indicates that the input color value is within the window region 1001. Thus in spite of the fact that in this example a color conversion (shift in hue) is to be executed based on the same attribute (hue) of the same color (yellow), conversion to two respectively different colors can be achieved for picture elements within the two window regions 1001, 1002.

Figure 12:
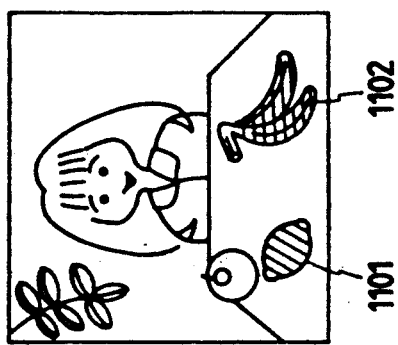
FIGS. 11a-b and 12a-b illustrate a color conversion operation which can be executed by the apparatus of FIG. 10.
Figure 12:
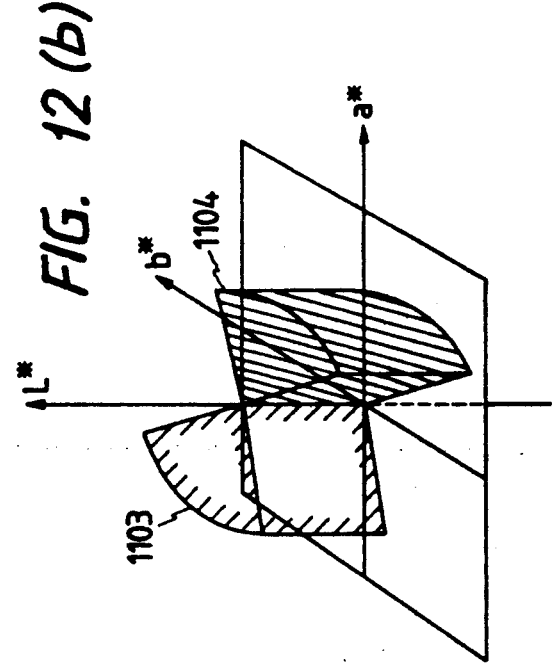
Figure 11:
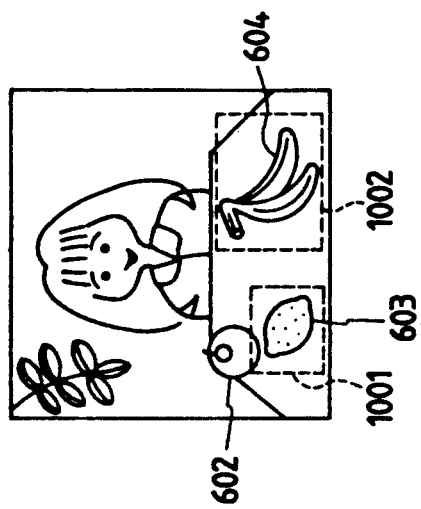
Figure 11:
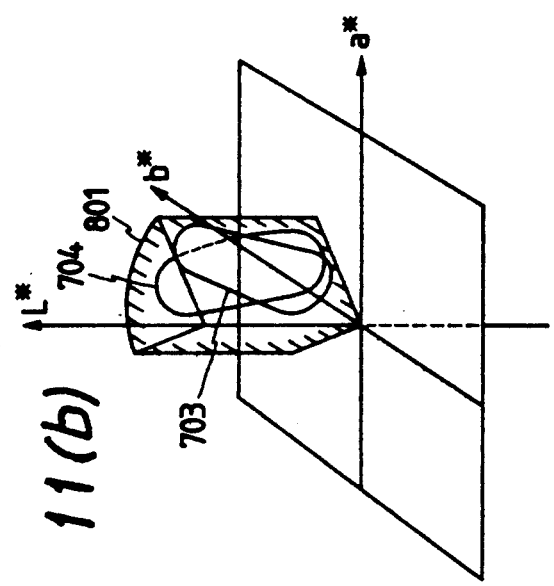

That point is illustrated by diagram (b) of FIG. 11 and diagram (b) of FIG. 12. Assuming that the closeness value $W_i$ is to be established, for each of the color conversion sections 209 and 309 only on the basis of closeness to the yellow hue, the range of color values in the (L* a* b*) color space which will be selected for color conversion by each of the color conversion section 209 and 309 can be considered to be the 3-dimensional region 801 in diagram (b) of FIG. 11. As viewed vertically to the a* b* plane, that region is in the shape of a fan, since the color closeness values are assumed in this example to be judged only on the basis of hue. As shown, the range of color values of the lemon 603, designated by numeral 703, and the range of color values of the banana 604, designated by numeral 704, mutually overlap within the selection region 801. However, due to the selection operation of the output signal from the window region judgement section 108' acting on the selector circuit 111, only the (yellow) color values of the lemon will be shifted to the region 1103 shown in diagram (b) of FIG. 12, i.e. shifted towards the green hue, while the (yellow) color values of the banana 604 will be shifted to the region 1104, i.e. shifted towards the red hue. Thus, in the finally obtained printed picture, the lemon will be green in hue, as indicated by numeral 1101 in diagram (a) of FIG. 12, while the banana will be red in hue as indicated by numeral 1102. As for the first embodiment, there will be no change in the chroma or luminance gradations of the reproduced picture from those of the original picture, within the color-converted regions 1101 and 1102.

Figure 10:
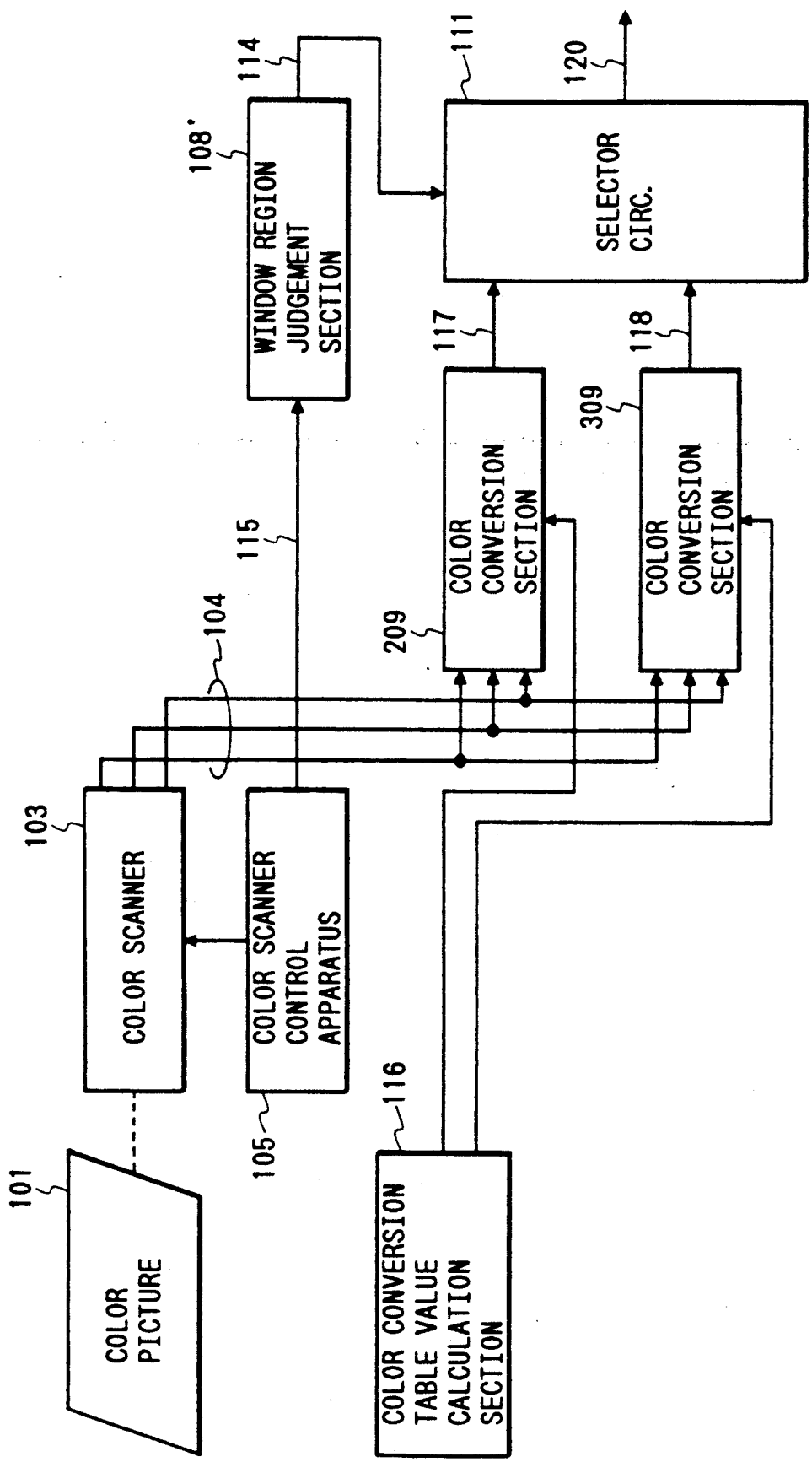
FIG. 10 is a general block diagram of a second embodiment of a color conversion apparatus according to the present invention.

The embodiment of FIG. 10 could of course be modified to enable a number of window regions greater than two to be used. The window sizes and positions can be arbitrarily selected, so that that great flexibility is provided by such an embodiment in changing respective color values within a plurality of window regions.

Figure 15:
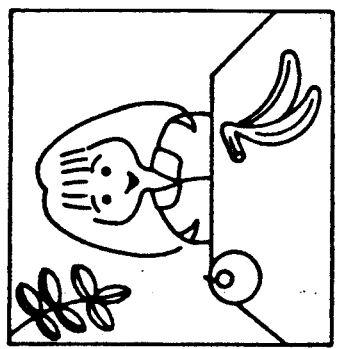
FIGS. 14a-b and 15a-b illustrate a color conversion operation which can be executed by the apparatus of FIG. 13.
Figure 15:
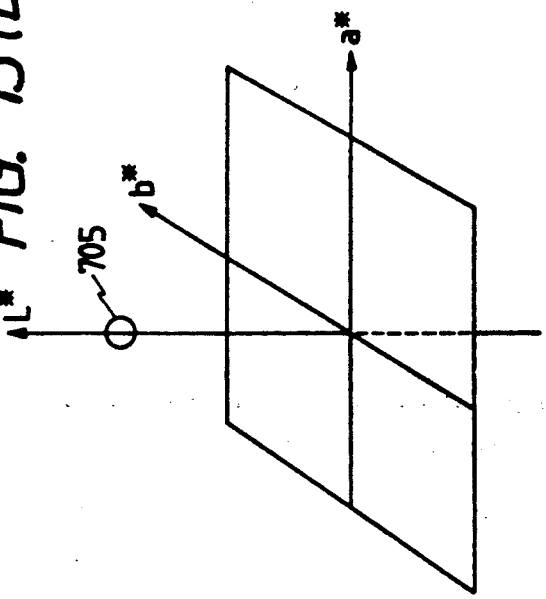

A third embodiment of the invention will be described referring to the general block diagram of FIG. 13, and the color conversion example of FIGS. 14 and 15. The objective of this embodiment is to enable any region (within a window region) that is within a predetermined range of closeness to a conversion origin color value, to be converted to a uniform monocolor state. In this example, any region within the window 1200 in diagram (a) of FIG. 14 which is within a predetermined range of closeness in hue to yellow (i.e. the lemon 603) is converted to monocolor white. As a result, since the background (i.e. table) color surrounding the lemon 603 is also white, the lemon will be eliminated from the reproduced color picture, as shown in diagram (a) of FIG. 15. Such an operation is illustrated in diagrams (b) of FIGS. 14, 15. The region 801 in diagram (b) of FIG. 14 represents color values which are within the specified range of closeness to the yellow hue. Any color value within that region is converted to the white value 705 shown in diagram (b) of FIG. 15, i.e. a color value having only a high value of luminance attribute, with the hue and chroma attributes both being zero.

Figure 13:
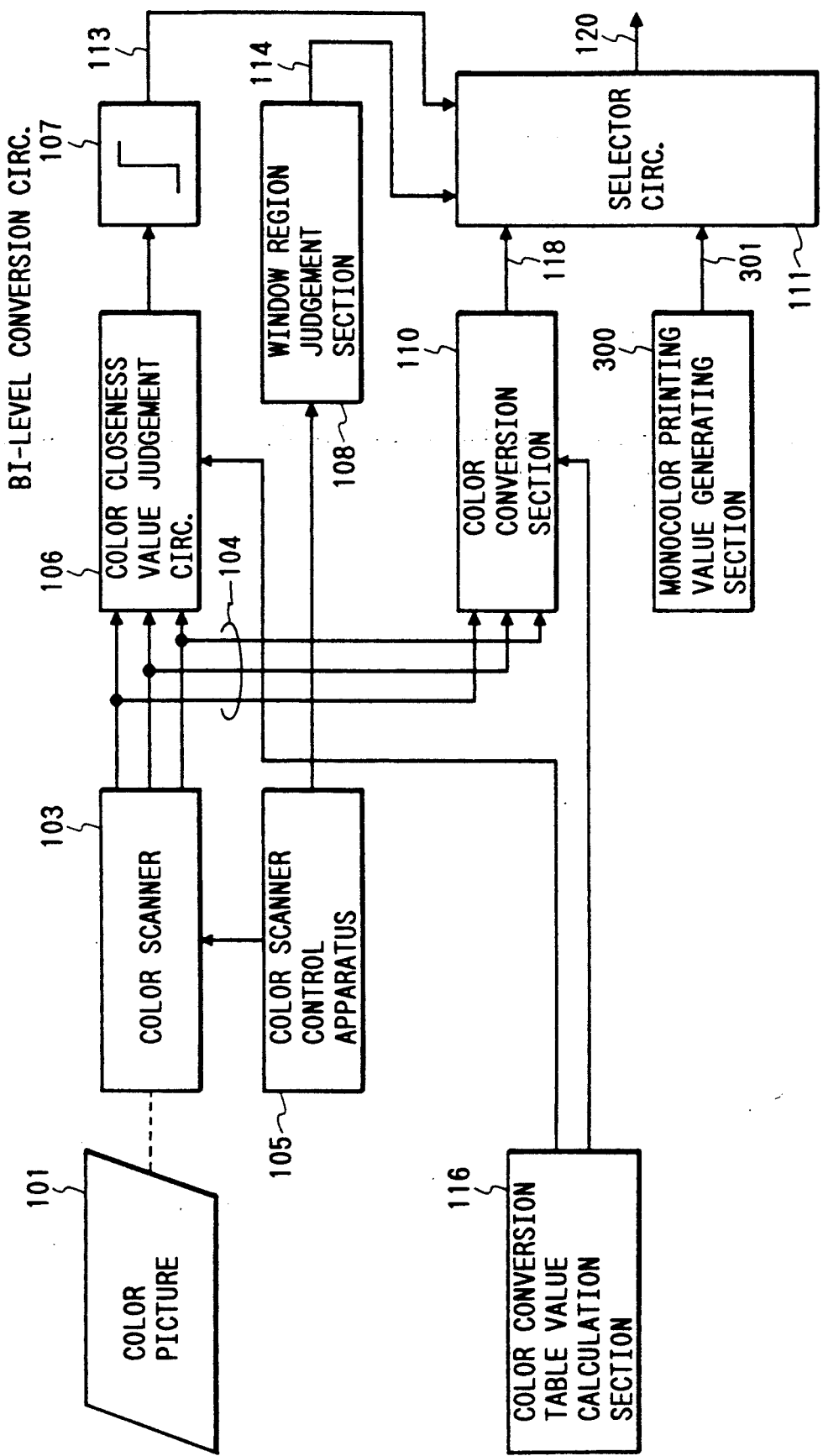
FIG. 13 is a general block diagram of a third embodiment of a color conversion apparatus according to the present invention.
Figure 14:
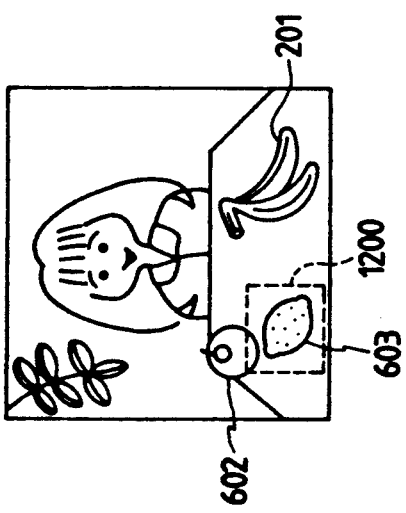
Figure 14:
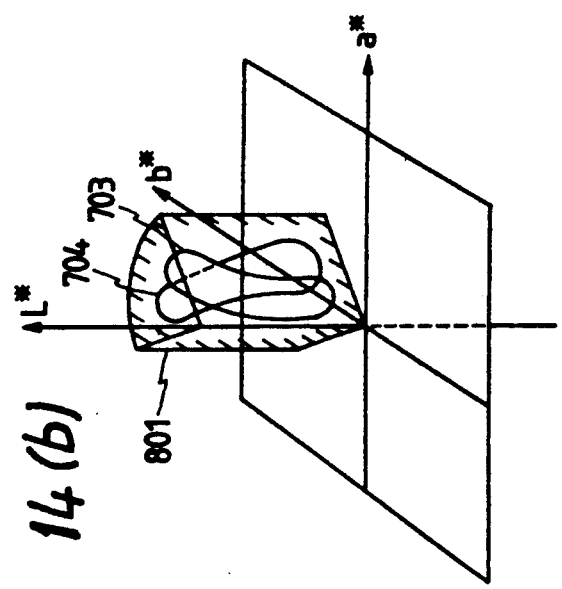

In FIG. 13, the operation of each of the closeness value judgement section 106, bi-level conversion circuit 107, window region judgement section 108 and color conversion section 110 is substantially identical to that described hereinabove for the embodiment of FIG. 3. That is to say, in response to each input color value supplied thereto, a corresponding printing value is outputted from the color conversion section 110, which has not been color-converted. However, instead of the color conversion section 109, an output printing value is continuously produced from a monocolor printing value generating section 300 during each picture scanning operation. That printing value is predetermined such as to result in a white color being printed by the color printer apparatus, by the aforementioned picture-sequential printing process.

The operation is as follows. The initialization operation for the color conversion section 110 and the closeness value judgement section 106 prior to each scanning operation by the color scanner 103 (e.g. for generating all of the C printing values as the output signal 120 that is sent to the color printer apparatus) is the same as that described hereinabove for the color conversion section 110 and the closeness value judgement section 106 of FIG. 3. During scanning operation by the color scanner 103, if an input color value is within the window region 1200, then a "1" level output signal is produced from the window region judgement section 108, while otherwise a "0" level output is produced. If an input color value is within the predetermined range of closeness to the specified hue (i.e. to the hue of the conversion origin color value), then the bi-level conversion circuit 107 produces an output signal at the "1" level, and otherwise at the "0" level. If both of the output signals from the bi-level conversion circuit 107 and window region judgement section 108 are at the "1" level, (which will occur when the input color value is a color value of the lemon 603 in FIG. 14(a)) then the selector circuit 111 selects the output printing value from the monocolor printing value generating section 300 to be transferred to the color printer apparatus. If either of the output signals from the bi-level conversion circuit 107 and window region judgement section 108 is at the "0" level, then the selector circuit 111 selects the output printing value from the color conversion section 110 to be transferred to the color printer apparatus.

It can thus be understood that in each of the four successive scanning operations by the color scanner 103 which are executed for deriving the C, M, Y and BK printing values to be sent to the color printer apparatus, an output printing value from the monocolor printing value generating section 300 will be transferred to the color printer apparatus in correspondence with each picture element of the lemon region 603 in the color picture. The output printing value produced from the monocolor printing value generating section 300 is predetermined such that the resultant four superimposed colors that are printed for each picture element of the lemon region will result in monocolor white. In that way, the lemon 603 will no longer appear in the printed color picture.

It can thus be understood that with this embodiment, even if the window region 1200 is made comparatively large and is not precisely adjusted (e.g. such as to closely surround the lemon 603), there is no danger that any other region (such as part of the apple 602) within the window will be accidentally modified in color as a result of the process whereby the desired region is converted to the monocolor state, so long as that other region is outside the predetermined range of closeness in color to the conversion origin color value.

It should be noted that although the present invention has been described in the above referring to three specific embodiments, various modifications to these embodiments could be envisaged which fall within the scope claimed for the invention. For example it would be possible to implement the functions of the embodiment of FIG. 3 by a modification of the embodiment of FIG. 10 whereby the color conversion section 309 of FIG. 10 is eliminated, and the window region judgement section 108 of FIG. 3 is utilized in place of the window region judgement section 108' of FIG. 10.

As can be understood from the above description, the present invention enables great freedom in altering color values within one or more selected regions of a color picture, whereby only color values that are within a specific region of the color picture and are also within a predetermined range of closeness to a conversion origin color value are altered. Moreover, it is possible to freely select the basis on which color closeness is judged, i.e. based upon one of (or a combination of) the color attributes of the conversion origin color value. Furthermore, it is possible to freely select the type of color conversion that is executed, i.e. a change of one of (or a combination of) the color attributes of an input color value. It is moreover possible to change color values within a selected region, which are within the aforementioned range of color closeness, to a uniform monocolor condition. Special effects such as erasure of a region from a reproduced color picture can thereby be achieved.

It can further be understood that the system configuration of a color conversion apparatus according to the present invention is basically simple, as is the operation. For example in FIG. 3 each of the color conversion sections 109, 110 and the closeness value judgement section 106 can have the same configuration, each based on a table memory as shown in FIG. 7. After the table memories have been initialized, generation of a printing value in response to each input color value corresponding to a picture element of the scanned color picture is executed simply by supplying that input color value to the table memories, to thereby derive a corresponding printing value. It is therefore unnecessary to execute complex real-time computations while image scanning is in progress, so that the overall circuit configuration can be simple.

What is claimed is:

1. A color conversion apparatus comprising:

means for generating successive input color values respectively corresponding to picture elements of an original color picture;

first judgement means for judging, for each of said input color values, whether said input color value is within a predetermined range of closeness in color to a predetermined conversion origin color value;

second judgement means for judging, for each of said input color values, whether a picture element corresponding to said input color value is within a predetermined region of said color picture;

color conversion means for altering at least one color attribute of each of a plurality of said input color values to obtain respective color-converted color values, said plurality including all of said input color values which are within said predetermined range of closeness;

selector means coupled to receive said color-converted color values and responsive to judgement results obtained by said first and second judgement means for transferring to an output terminal thereof each of said color-converted color values which corresponds to an input color value that is within said predetermined region of the original color picture and which is within said predetermined degree of closeness to the conversion origin color value.

2. A color conversion apparatus according to claim 1, wherein said first judgement means and said color conversion means comprise respective table memories having stored therein respective predetermined sets of values, and further comprising initialization means for generating said sets of values and storing said sets of values into said table memories, prior to an operation for generating said successive input color values.

3. A color conversion apparatus according to claim 1 wherein said color conversion means executes a variable degree of change in said at least one color attribute of an input color value, in accordance with a magnitude of said degree of closeness.

4. A color conversion apparatus according to claim 1 wherein said degree of closeness is derived as a closeness value expressed as a numeric value by deriving a first closeness value between a first color attribute of an input color value and a corresponding color attribute of said conversion origin color value and normalizing said first closeness value to become a numeric value in the range zero to one, deriving a second closeness value between a second color attribute of an input color value and a corresponding color attribute of said conversion origin color value and normalizing said second closeness value to become a numeric value in the range zero to one, and multiplying together said normalized first and second closeness values.

5. A color conversion apparatus comprising:

means for generating successive input color values respectively corresponding to picture elements of an original color picture;

judgement means for producing a control signal for selectively indicating, for each of said input color values, that a picture element corresponding to said input color value is within one of at least two predetermined regions of said original color picture;

at least a first color conversion means and second color conversion means coupled in common to receive said successive input color values, said first color conversion means being responsive to each of said color values that is within a predetermined range of closeness to a first predetermined conversion origin color value for generating a color-converted output color value that is shifted with respect to said first conversion origin color value towards a first predetermined color value, and said second color conversion means being responsive to each of said color values that is within a predetermined range of closeness to a second predetermined conversion origin color value for generating a color-converted output color value that is shifted with respect to said second conversion origin color value towards a second predetermined color value; and selector means responsive to said control signal for transferring to an output terminal thereof a color-converted color value produced from said first color conversion means in response to an input color value when said control signal indicates that said input color value corresponds to a position within said first predetermined region, and for transferring to said output terminal a color-converted color value that is produced from said second color conversion means in response to an input color value when said control signal indicates that said input color value corresponds to a position within said second predetermined region.

6. A color conversion apparatus for generating an output signal consisting of successive printing values, to be supplied to a color printer apparatus, said color conversion apparatus comprising:

scanner means for scanning an original color picture to obtain successive input color values, and control means for controlling said scanner means;

first judgement means for producing a first control signal for selectively indicating, for each of said input color values, whether a picture element corresponding to said input color value is within a predetermined range of closeness in color to a conversion origin color value;

second judgement means for producing a second control signal for selectively indicating, for each of said input color values, whether said input color value is within a predetermined region of said original color picture;

first color conversion means for altering at least one color attribute of each of said input color values, in accordance with a degree of closeness between said input color value and said conversion origin color value, and for applying color correction processing to a resultant color-converted color value to obtain a corresponding printing value;

second color conversion means for applying color correction processing to each of said input color values to obtain a corresponding printing value;

selector means responsive to said first and second control signals in combination, for transferring to said color printer apparatus a printing value produced from said first color conversion means when said printing value corresponds to a color value of a picture element of said original color picture which is located within said predetermined region of the color picture and said color value is within said predetermined range of closeness to the conversion origin color value, for transferring to said color printer apparatus a printing value produced from said second color conversion means when said printing value corresponds to a color value of a picture element of said original color picture which is located within said predetermined region of the color picture and said color value is outside said predetermined range of closeness to the conversion origin color value, and for transferring to said color printer apparatus a printing value produced from said second color conversion means when said printing value corresponds to a color value of a picture element of said original color picture which is located outside said predetermined region of the color picture and said color value is outside said predetermined range of closeness to the conversion origin color value.

7. A color conversion apparatus according to claim 6, wherein each of said first judgement means and said first and second color conversion means comprises at least one table memory having stored therein a predetermined set of data values, and further comprising table initialization means for generating and storing in said table memories said data values prior to a scanning operation by said scanner means.

8. A color conversion apparatus according to claim 7, in which each of said first judgement means and said first and second color conversion means comprises a table memory having stored therein a set of data values respectively corresponding to specific high-order bits of a set of color values, interpolation coefficient generating means responsive to specific low-order bits of said set of color values for generating respective interpolation coefficients, and interpolation processing means for combining an output value produced from said table memory in response to a set of high-order bits of an input color value and an output value produced from said interpolation coefficient generating means in response to a set of low-order bits of said input color value to obtain an output data value.

9. A color conversion apparatus for generating an output signal consisting of successive printing values, to be supplied to a color printer apparatus, said color conversion apparatus comprising:

scanner means for scanning an original color picture to obtain successive input color values;

first judgement means for producing a first control signal for selectively indicating, for each of said input color values, whether said input color value is within a predetermined range of closeness in color to a conversion origin color value;

second judgement means for producing a second control signal for selectively indicating, for each of said input color values, whether a picture element corresponding to said input color value is within a predetermined region of said original color picture;

first color conversion means for altering at least one color attribute of each of said input color values, in accordance with a degree of closeness between said input color value and said conversion origin color value, and for applying color correction processing to a resultant color-converted color value to obtain a corresponding printing value;

second color conversion means for applying color correction processing to each of said input color values to obtain a corresponding printing value;

selector means responsive to said first and second control signals in combination for transferring to said color printer apparatus a printing value produced from said first color conversion means when said printing value corresponds to a color value of a picture element of said original color picture which is located within said predetermined region of the color picture and said color value is within said predetermined range of closeness to the conversion origin color value, and for transferring to said color printer apparatus a printing value produced from said second color conversion means when said printing value corresponds to a color value of said original color picture which is outside said predetermined range of closeness to the conversion origin color value.

10. A color conversion apparatus for generating an output signal consisting of successive printing values, to be supplied to a color printer apparatus, said color conversion apparatus comprising:

scanner means for scanning an original color picture to obtain successive input color values;

judgement means for producing a control signal for selectively indicating, for each of said input color values, whether a picture element corresponding to said input color value is within first and second predetermined regions of said original color picture;

first color conversion means for judging, for each of said input color values, whether said input color value is within a predetermined range of color closeness to a first conversion origin color value, for altering at least one color attribute of said input color value if the color value is judged to be within said range and for applying color correction processing to a resultant color-converted color value to obtain a corresponding printing value, and for otherwise applying color correction processing to said input color value to obtain a corresponding printing value;

second color conversion means for judging, for each of said input color values, whether said input color value is within a predetermined range of color closeness to a second conversion origin color value, for altering at least one color attribute of said input color value if the color value is judged to be within said range and for applying color correction processing to a resultant color-converted color value to obtain a corresponding printing value, and for otherwise applying color correction processing to said input color value to obtain a corresponding printing value; and selector means responsive to said control signal for transferring to said color printer apparatus a printing value produced from said first color conversion means when said printing value corresponds to a color value of a picture element of said original color picture which is located within said first predetermined region of the color picture and said color value is within said predetermined range of closeness to said first conversion orgin color value, for transferring to said color printer apparatus a printing value produced from said second color conversion means when said printing value corresponds to a picture element of said original color picture which is within said second predetermined region of the color picture and said color value is within said predetermined range of closeness to said second conversion origin color value, and for otherwise transferring to said color printer apparatus a printing value produced from an arbitrarily determined one of said first and second color conversion means.

11. A color conversion apparatus for generating an output signal consisting of successive printing values, to be supplied to a color printer apparatus, said color conversion apparatus comprising:

scanner means for scanning an original color picture to obtain successive input color values;

first judgment means for producing a first control signal for selectively indicating, for each of said input color values, whether said input color value is within a predetermined range of closeness in color to a conversion origin color value;

second judgement means for producing a second control signal for selectively indicating, for each of said input color values, whether a picture element corresponding to said input color value is within a predetermined region of said original color picture;

color conversion means for applying color correction processing to each of said input color values to obtain a corresponding printing value;

monocolor value generating means for generating printing values predetermined to result in printing of a predetermined color having fixed color attributes by said color printer apparatus; and selector means responsive to said first and second control signals in combination for transferring to said color printer apparatus a printing value produced from said monocolor value generating means when said printing value corresponds to a color value of a picture element of said original color picture which is located within said predetermined region of the color picture and said color value is within said predetermined range of closeness to the conversion origin color value, and for transferring to said color printer apparatus a printing value produced from said color conversion means when said printing value corresponds to a color value of said original color picture which is outside said predetermined range of closeness to the conversion origin color value.

* * * * *